United States Patent
Chan et al.

(10) Patent No.: US 10,691,143 B2
(45) Date of Patent: Jun. 23, 2020

(54) MANIFOLDS AND METHODS AND SYSTEMS USING THEM

(71) Applicants: Brian Chan, MArkham (CA); Hamid Badiei, Woodbridge (CA); James Botelho, Danbury, CT (US)

(72) Inventors: Brian Chan, MArkham (CA); Hamid Badiei, Woodbridge (CA); James Botelho, Danbury, CT (US)

(73) Assignees: PerkinElmer Health Sciences, Inc., Waltham, MA (US); PerkinElmer Health Sciences Canada, Inc., Woodbridge (ON) (CA)

( * ) Notice: Subject to any disclaimer, the term of this patent is extended or adjusted under 35 U.S.C. 154(b) by 0 days.

(21) Appl. No.: 16/248,603

(22) Filed: Jan. 15, 2019

(65) Prior Publication Data

US 2019/0250644 A1      Aug. 15, 2019

Related U.S. Application Data

(63) Continuation of application No. 13/624,351, filed on Sep. 21, 2012, now abandoned.

(51) Int. Cl.
*G05D 7/03*       (2006.01)
*F16K 41/10*    (2006.01)
*F16K 11/044*  (2006.01)
*F16K 11/065*  (2006.01)

(52) U.S. Cl.
CPC .............. *G05D 7/03* (2013.01); *F16K 11/044* (2013.01); *F16K 11/0655* (2013.01); *F16K 41/10* (2013.01); *Y10T 137/87788* (2015.04)

(58) Field of Classification Search
CPC ..... G05D 7/03; F16K 11/0655; F16K 11/044; F16K 41/10; F16K 11/07; Y10T 137/87788; Y10T 137/86895; Y10T 137/86815; Y10T 137/86163; Y10T 137/86686; Y10T 137/86879
USPC ........ 137/872, 625.5, 625.4, 565.33, 625.27, 137/625.48
See application file for complete search history.

(56) References Cited

U.S. PATENT DOCUMENTS

| | | | | |
|---|---|---|---|---|
| 2,796,887 | A ‡ | 6/1957 | Stern ...................... | F16K 3/243 137/625.48 |
| 4,285,467 | A ‡ | 8/1981 | Maltby | |
| 5,443,241 | A ‡ | 8/1995 | Odaira ............... | B60H 1/00485 251/129.07 |
| 6,053,200 | A ‡ | 4/2000 | Crochet ................ | F16K 11/044 137/557 |
| 7,438,534 | B2 ‡ | 10/2008 | Holland .............. | C23C 16/4412 417/26 |
| 2001/0052586 | A1‡ | 12/2001 | Tamura | |
| 2002/0094277 | A1‡ | 7/2002 | Gaudet ................... | F04B 37/08 417/44.1 |
| 2003/0000585 | A1‡ | 1/2003 | Cooper | |

(Continued)

*Primary Examiner* — Michael R Reid
(74) *Attorney, Agent, or Firm* — Rhodes IP PLC; Christopher R Rhodes

(57) ABSTRACT

Certain embodiments described herein are directed to manifolds that comprise a moveable, internal sealing member that can be used to engage one or more ports of the manifold and prevent or reduce fluid flow from the engaged port into the manifold. In certain examples, the manifold can be used in a mass spectrometer to control fluid flow from an interface and a turbomolecular pump.

20 Claims, 18 Drawing Sheets

(56) References Cited

U.S. PATENT DOCUMENTS

| | | | |
|---|---|---|---|
| 2005/0194993 A1‡ | 9/2005 | Lablans | |
| 2006/0038992 A1‡ | 2/2006 | Morrisroe | |
| 2006/0130912 A1‡ | 6/2006 | Lodolo | F16K 11/044 137/625.27 |
| 2009/0208649 A1* | 8/2009 | Bailey | C23C 16/4412 427/248.1 |
| 2010/0108925 A1* | 5/2010 | Kannoo | F16K 11/074 251/129.11 |
| 2011/0174969 A1‡ | 7/2011 | Seyfarth | |
| 2011/0210241 A1‡ | 9/2011 | Badiei | |

\* cited by examiner
‡ imported from a related application

MANIFOLDS AND METHODS AND SYSTEMS USING THEM

TECHNOLOGICAL FIELD

Certain features, aspects and embodiments are directed to manifolds. In particular, certain embodiments described herein are directed to manifolds that can be used in a mass spectrometer.

BACKGROUND

In many analytical instruments, fluid flow is directed or controlled during operation of the instrument. For example, in mass spectrometers, the fluid flow can be controlled during operation of the mass spectrometer.

SUMMARY

In one aspect, a vacuum manifold comprising a housing comprising a first port configured to provide fluidic coupling between a sampling interface line and the manifold is provided. In some embodiments, the manifold also comprises a second port on the housing that is configured to provide fluidic coupling between a pump backing line, e.g., a turbomolecular pump backing line, and the manifold. In other embodiments, the manifold also comprises a third port on a housing that is configured to provide fluidic coupling between a mechanical roughing pump and the manifold. In certain embodiments, the manifold also comprises a moveable sealing member in the vacuum manifold, e.g., an internal moveable sealing member, in which the moveable sealing member comprises a first position effective to permit fluid flow between the first port and the third port and effective to block fluid flow from the second port, in which the moveable sealing member comprises a second position effective to permit fluid flow between the second port and the third port and effective to block fluid flow from the first port, in which the moveable sealing member further comprises a third position effective to permit fluid flow between the first port, the second port and the third port.

In certain examples, the moveable sealing member comprises a sealing device configured to engage the second port in the first position of the moveable sealing member to provide a substantially fluid tight seal between the sealing member and the second port. In other examples, the sealing device is configured to engage the first port in the second position of the moveable sealing member to provide a substantially fluid tight seal between the sealing member and the first port. In some examples, the sealing device comprises a first O-ring that is between the sealing device and the second port when the sealing member is in the first position, and a second O-ring that is between the sealing device and the first port when the sealing member is in the second position. In some embodiments, the manifold may include, or may be coupled to, an actuator coupled to the moveable sealing member. In some examples, the actuator comprises a motor. In other examples, the sealing member comprises a plunger coupled to the actuator. In certain embodiments, the plunger comprises a longitudinal shaft coupled to the actuator and a disk coupled to the longitudinal shaft in an orthogonal direction to the longitudinal shaft, the disk configured to engage an interior manifold surface adjacent to the first port in the second position of the moveable sealing member to provide a substantially fluid tight seal between the plunger and the first port to block fluid flow into the manifold from the sampling interface line, in which the disk is further configured to engage an interior manifold surface adjacent to the second port in the first position of the moveable sealing member to provide a substantially fluid tight seal between the plunger and the second port to block fluid flow into the manifold from the pump backing line.

In other embodiments, the sealing member can include a plunger comprising a first longitudinal shaft of a first outer diameter coupled to the actuator and a second longitudinal shaft of a second outer diameter, greater than the first outer diameter, coupled to the first longitudinal shaft, in which an end of the second longitudinal shaft is configured to engage an interior manifold surface adjacent to the first port in the second position of the moveable sealing member to provide a substantially fluid tight seal between the plunger and the first port to block fluid flow into the manifold from the sampling interface line, in which an opposite end of the second longitudinal shaft is configured to engage an interior manifold surface adjacent to the second port in the first position of the moveable sealing member to provide a substantially fluid tight seal between the plunger and the second port to block fluid flow into the manifold from the pump backing line. In some embodiments, the second outer diameter is selected to be at least 5% greater than a diameter of the first port.

In other embodiments, the sealing member comprises a plunger comprising a longitudinal shaft coupled to the actuator and a barbell end coupled to the longitudinal shaft, in which a first surface of the barbell end is configured to engage an interior manifold surface adjacent to the first port in the second position of the moveable sealing member to provide a substantially fluid tight seal between the engaged first surface and the first port to block fluid flow into the manifold from the sampling interface line, in which a second surface of the barbell end is configured to engage an interior manifold surface adjacent to the second port in the first position of the moveable sealing member to provide a substantially fluid tight seal between the engaged second surface and the second port to block fluid flow into the manifold from the backing line.

In some examples, the third position of the sealing member is selected to position a terminal end of the sealing member closer to the first port of manifold than to the second port of the manifold. In other examples, the third position of the sealing member is selected to provide a selected fluidic conductance. In other embodiments, the sealing member comprises an actuator coupled to a longitudinal shaft, and a disk coupled to the longitudinal shaft in an orthogonal direction, in which the longitudinal shaft comprises a bellows effective to provide a substantially fluid tight seal between the housing and a site of the housing where the longitudinal shaft of the sealing member enters the housing. In some embodiments, the actuator comprises a motor. In other embodiments, the second position of the sealing member is provided after a fixed amount of steps using the motor. In certain configurations, the sealing member comprises a substantially inert material. In some embodiments, the substantially inert material is a plastic, a stainless steel, polytetrafluoroethylene, aluminum, titanium or an Inconel alloy.

In certain examples, the sealing member is configured for use with an inductively coupled plasma mass spectrometer system, in which the sealing member is configured to be in the first position when a vacuum is off and the plasma is off, in which the sealing member is configured to be in the second position when the vacuum is on and when the plasma is off, and in which the sealing member is configured to be in the third position when the plasma is on. In some embodiments, the vacuum manifold is configured as a valveless manifold.

In another aspect, a vacuum manifold comprising a first inlet port and a second inlet port each configured to permit fluid flow into the manifold, the manifold comprising an internal sealing member configured to prevent fluid flow into the manifold from the second port in a first position of the internal sealing member, the internal sealing member further configured to prevent fluid flow into the manifold from the first port in a second position of the internal sealing member, and the internal sealing member further configured to permit fluid flow into the manifold from both the first port and the second port in a third position of the internal sealing member is described. In some embodiments, the internal sealing member is an internal moveable sealing member, e.g., one where it may be translated or physically moved in one or more directions.

In certain embodiments, the manifold can include an outlet port configured to permit fluid flow out of the manifold. In other embodiments, the outlet port is fluidically coupled to a vacuum pump that is effective to increase fluid flow into the manifold from the first port and from the second port when the internal sealing member is in the third position. In some examples, the internal sealing member is configured to be positioned closer to the second port than the first port when the internal sealing member is in the third position. In certain embodiments, the third position of the internal sealing member is selected to provide a selected fluidic conductance.

In certain examples, the internal sealing member comprises a plunger coupled to a longitudinal shaft, in which the plunger is sized and arranged to seal to a first internal surface of the manifold in the first position of the sealing member to prevent fluid flow into the manifold from the second port, and in which the plunger is also sized and arranged to seal to a second internal surface of the manifold in the second position of the sealing member to prevent fluid flow into the manifold from the first port. In some embodiments, the plunger comprises a disk coupled to the longitudinal shaft. In certain examples, the plunger comprises a barbell-shaped end coupled to the longitudinal shaft. In some embodiments, the plunger comprises a second longitudinal shaft coupled to the first longitudinal shaft, in which an outer diameter of the second longitudinal shaft is greater than an outer diameter of the first longitudinal shaft. In additional examples, the outer diameter of the second longitudinal shaft is configured to be at least 5% larger than a diameter of the first port. In some examples, the plunger comprises a first O-ring configured to provide a substantially fluid tight seal between the plunger and the second port when the sealing member is in the first position. In certain embodiments, the plunger comprises a second O-ring configured to provide a substantially fluid tight seal between the plunger and the first port when the sealing member is in the second position. In other embodiments, the plunger comprises a first O-ring configured to provide a substantially fluid tight seal between the plunger and the first port when the sealing member is in the second position. In some examples, the longitudinal shaft can be coupled to an actuator effective to move the sealing member between the first position, the second position and the third position. In certain examples, the actuator comprises a ternary device configured to move the sealing member sequentially between the first position, the second position and the third position. In some embodiments, the actuator comprises a motor. In certain instances, the motor is a stepper motor. In certain embodiments, the sealing member comprises a substantially inert material comprising one or more of a plastic, a stainless steel, polytetrafluoroethylene, aluminum, titanium or an Inconel alloy. In some examples, the sealing member is configured for use with an inductively coupled plasma mass spectrometer system, in which the sealing member is configured to be in the first position when a vacuum is off and the plasma is off, in which the sealing member is configured to be in the second position when the vacuum is on and when the plasma is off, and in which the sealing member is configured to be in the third position when the plasma is on. In some embodiments, the vacuum manifold is configured as a valveless manifold.

In an additional aspect, a manifold comprising a first port configured to provide fluidic coupling between a sampling interface of the inductively coupled plasma mass spectrometer and a first pump of an inductively coupled plasma mass spectrometer, and comprising a second port configured to provide fluidic coupling between a second pump of the inductively coupled plasma mass spectrometer and the first pump, the manifold comprising an internal sealing member configured to be positioned at a first position in the manifold to block fluid flow between the first pump and the second pump, the internal sealing member further configured to be positioned at a second position in the manifold to block fluid flow between the sampling interface and the first pump, and the internal sealing member further configured to be positioned at a third position in the manifold to permit fluid flow between the sampling interface and the first pump and to permit fluid flow between the second pump and the first pump is disclosed. In certain embodiments, the internal sealing member can be configured to by translated or physically displaced as it is positioned at the different positions.

In certain embodiments, the first pump is configured as a mechanical roughing pump. In some embodiments, the second pump is configured as a turbomolecular pump. In other embodiments, the manifold comprises an outlet port that is fluidically coupled to the first pump and is effective to increase fluid flow into the manifold from the first port and from the second port when the internal sealing member is in the third position. In some examples, the internal sealing member is configured to be positioned closer to the second port than the first port when the internal sealing member is in the third position. In other embodiments, the third position of the internal sealing member is selected to provide a selected fluidic conductance. In certain examples, the internal sealing member comprises a plunger coupled to a longitudinal shaft, in which the plunger is sized and arranged to seal to a first internal surface of the manifold in the first position of the sealing member to prevent fluid flow into the manifold from the second port, and in which the plunger is also sized and arranged to seal to a second internal surface of the manifold in the second position of the sealing member to prevent fluid flow into the manifold from the first port. In some embodiments, the plunger comprises an orthogonal disk coupled to the longitudinal shaft. In certain instances, the plunger comprises a barbell-shaped end coupled to the longitudinal shaft. In other instances, the plunger comprises a second longitudinal shaft coupled to the first longitudinal shaft, in which an outer diameter of the second longitudinal shaft is greater than an outer diameter of the first longitudinal shaft. In certain examples, the outer diameter of the second longitudinal shaft is configured to be at least 5% larger than a diameter of the first port. In other embodiments, the plunger comprises a first O-ring configured to provide a substantially fluid tight seal between the plunger and the second port when the sealing member is in the first position. In some embodiments, the plunger comprises a second O-ring configured to provide a substantially fluid tight seal between the plunger and the first port when the sealing member is in the second position. In additional embodiments, the plunger comprises a first O-ring configured to provide a substantially fluid tight seal between the plunger and the first port when the sealing member is in the second position.

In certain examples, the longitudinal shaft is coupled to an actuator effective to move the sealing member between the first position, the second position and the third position. In certain embodiments, the actuator comprises a ternary device configured to move the sealing member sequentially between the first position, the second position and the third position. In some examples, the actuator comprises a motor. In other examples, the motor is a stepper motor. In some embodiments, the internal sealing member comprises a substantially inert material comprising one or more of a plastic, a stainless steel, polytetrafluoroethylene, aluminum, titanium or an Inconel alloy. In additional embodiments, the sealing member is configured to be in the first position when a vacuum is off and the plasma is off, in which the sealing member is configured to be in the second position when the vacuum is on and when the plasma is off, and in which the sealing member is configured to be in the third position when the plasma is on. In further embodiments, the vacuum manifold is configured as a valveless manifold.

In another aspect, a system comprising a manifold comprising a first inlet port, a second inlet port and an outlet port is provided. In some embodiments, the system can include a first pump fluidically coupled to the outlet port, a second pump fluidically coupled to the first inlet port, and a sampling interface fluidically coupled to the second inlet port. In some embodiments, the manifold further comprises an internal sealing member configured to be positioned at a first position in the manifold to block fluid flow between the first pump and the second pump, the internal sealing member further configured to be positioned at a second position in the manifold to block fluid flow between the sampling interface and the first pump, and the internal sealing member further configured to be positioned at a third position in the manifold to permit fluid flow between the sampling interface and the first pump and to permit fluid flow between the second pump and the first pump.

In certain examples, the system can also include an inductively coupled plasma torch configured to fluidically couple to the sampling interface. In other embodiments, the system can include at least one induction device configured to sustain an inductively coupled plasma in the inductively coupled plasma torch. In some embodiments, the induction device is configured as a helical induction coil. In other embodiments, the induction device is configured as at least one flat plate electrode. In further embodiments, the first pump is a mechanical roughing pump and the second pump is a turbomolecular pump. In some instances, the system can include a mass analyzer fluidically coupled to the sampling interface. In other instances, the system can include a detector fluidically coupled to the mass analyzer. In certain embodiments, the system can include a sample introduction system fluidically coupled to the inductively coupled plasma torch. In certain embodiments, the system can include at least one ion lens fluidically coupled to the sampling interface. In other embodiments, the system can include a collision/reaction cell.

In certain embodiments, the internal sealing member of the system comprises a plunger coupled to a longitudinal shaft, in which the plunger is sized and arranged to seal to a first internal surface of the manifold in the first position of the sealing member to prevent fluid flow into the manifold from the second pump, and in which the plunger is also sized and arranged to seal to a second internal surface of the manifold in the second position of the sealing member to prevent fluid flow into the manifold from the sampling interface. In some instances, the plunger comprises an orthogonal disk coupled to the longitudinal shaft. In certain embodiments, the plunger comprises a barbell-shaped end coupled to the longitudinal shaft. In other embodiments, the plunger comprises a second longitudinal shaft coupled to the first longitudinal shaft, in which an outer diameter of the second longitudinal shaft is greater than an outer diameter of the first longitudinal shaft. In further embodiments, the outer diameter of the second longitudinal shaft is configured to be at least 5% larger than a diameter of the first port. In additional embodiments, the plunger comprises a first O-ring configured to provide a substantially fluid tight seal between the plunger and the second port when the sealing member is in the first position. In some embodiments, the plunger comprises a second O-ring configured to provide a substantially fluid tight seal between the plunger and the first port when the sealing member is in the second position. In certain examples, the plunger comprises a first O-ring configured to provide a substantially fluid tight seal between the plunger and the first port when the sealing member is in the second position. In other embodiments, the longitudinal shaft is coupled to an actuator effective to move the sealing member between the first position, the second position and the third position. In certain embodiments, the actuator comprises a ternary device configured to move the sealing member sequentially between the first position, the second position and the third position. In other embodiments, the actuator comprises a motor, e.g., a stepper motor. In some embodiments, the internal sealing member comprises a substantially inert material comprising one or more of a plastic, a stainless steel, polytetrafluoroethylene, aluminum, titanium or an Inconel alloy. In other embodiments, the sealing member is configured to be in the first position when a vacuum is off and the plasma is off, in which the sealing member is configured to be in the second position when the vacuum is on and when the plasma is off, and in which the sealing member is configured to be in the third position when the plasma is on.

In an additional aspect, a system comprising an atomization/ionization device configured to sustain an ionization source, an induction device configured to provide energy to the ionization device to sustain the ionization source in the ionization device, a manifold comprising a first inlet port, a second inlet port and an outlet port, a first pump fluidically coupled to the outlet port, a second pump fluidically coupled to the first inlet port, a sampling interface fluidically coupled to the second inlet port and to the ionization device, in which the manifold further comprises an internal sealing member configured to be positioned at a first position in the manifold to block fluid flow between the first pump and the second pump, the internal sealing member further configured to be positioned at a second position in the manifold to block fluid flow between the sampling interface and the first pump, and the internal sealing member further configured to be positioned at a third position in the manifold to permit fluid flow between the sampling interface and the first pump and to permit fluid flow between the second pump and the first pump is provided.

In certain embodiments, the ionization device is an inductively coupled plasma. In other embodiments, the induction device comprises a helical induction coil. In other examples, the induction device comprises at least one flat plate electrode. In certain embodiments, the first pump is a mechanical roughing pump and the second pump is a turbomolecular pump. In certain embodiments, the system can include a mass analyzer fluidically coupled to the sampling interface. In certain embodiments, the system can include a detector fluidically coupled to the mass analyzer. In other embodiments, the system can include a sample introduction system fluidically coupled to the ionization device. In some examples, the system can include at least one ion lens fluidically coupled to the sampling interface. In additional examples, the system can include a collision/reaction cell.

In certain examples, the internal sealing member of the system comprises a plunger coupled to a longitudinal shaft, in which the plunger is sized and arranged to seal to a first internal surface of the manifold in the first position of the sealing member to prevent fluid flow into the manifold from the second pump, and in which the plunger is also sized and arranged to seal to a second internal surface of the manifold in the second position of the sealing member to prevent fluid flow into the manifold from the sampling interface. In some embodiments, the plunger comprises an orthogonal disk coupled to the longitudinal shaft. In other embodiments, the plunger comprises a barbell-shaped end coupled to the longitudinal shaft. In certain examples, the plunger comprises a second longitudinal shaft coupled to the first longitudinal shaft, in which an outer diameter of the second longitudinal shaft is greater than an outer diameter of the first longitudinal shaft. In further examples, the outer diameter of the second longitudinal shaft is configured to be at least 5% larger than a diameter of the first port. In additional examples, the plunger comprises a first O-ring configured to provide a substantially fluid tight seal between the plunger and the second port when the sealing member is in the first position. In some embodiments, the plunger comprises a second O-ring configured to provide a substantially fluid tight seal between the plunger and the first port when the sealing member is in the second position. In additional embodiments, the plunger comprises a first O-ring configured to provide a substantially fluid tight seal between the plunger and the first port when the sealing member is in the second position. In some examples, the longitudinal shaft is coupled to an actuator effective to move the sealing member between the first position, the second position and the third position. In further embodiments, the actuator comprises a ternary device configured to move the sealing member sequentially between the first position, the second position and the third position. In some instances, the actuator comprises a motor, e.g., a stepper motor. In some embodiments, the internal sealing member of the system comprises a substantially inert material comprising one or more of a plastic, a stainless steel, polytetrafluoroethylene, aluminum, titanium or an Inconel alloy. In certain embodiments, the sealing member is configured to be in the first position when a vacuum is off and the plasma is off, in which the sealing member is configured to be in the second position when the vacuum is on and when the plasma is off, and in which the sealing member is configured to be in the third position when the plasma is on. In other embodiments, the manifold is configured as a valveless manifold.

In another aspect, a method of analyzing species using a mass spectrometer, the method comprising actuating an internal sealing member of a manifold between a first position, a second position and a third position, the first position effective to block fluid flow from a pump backing line into the manifold, the second position effective to block fluid flow from a sampling interface into the manifold, and the third position effective to permit fluid flow between the pump backing line and a roughing pump and between the sampling interface line and the roughing pump is provided.

In certain embodiments, the method comprises engaging a sealing device of the sealing member to an internal surface of the manifold to block fluid flow from the pump backing line into the manifold in the first position of the sealing member. In some embodiments, the method comprises engaging a sealing device of the sealing member to an internal surface of the manifold to block fluid flow from the sampling interface into the manifold in the second position of the sealing member. In certain examples, the method comprises positioning a sealing device of the internal sealing member to be closer to the second port in the third position of the sealing member. In other examples, the method comprises initiating a vacuum when the sealing member is in the second position. In further examples, the method comprises igniting an ionization source when the sealing member is in the second position. In additional examples, the method comprises actuating the sealing member from the second position to the third position after the ionization source is ignited.

In certain embodiments the method comprises configuring the sealing member with a longitudinal shaft coupled to a plunger. In some embodiments, the plunger comprises a single head or a double head. In other embodiments, the method comprises configuring the manifold to be a valveless manifold.

In another aspect, a method of operating an inductively coupled plasma mass spectrometer comprising actuating an internal sealing member of a vacuum manifold between a first position, effective to block fluid flow from a pump backing line into the manifold, to a second position, effective to permit fluid flow from the pump backing line into the manifold when a vacuum is initiated in the inductively coupled plasma mass spectrometer, and actuating the internal sealing member to a third position to permit fluid flow into the manifold from the pump backing line and to permit fluid flow into the manifold from a sampling interface line when the vacuum is present and when the plasma is sustained is described.

In certain embodiments, the method comprises engaging a sealing device of the sealing member to an internal surface of the manifold to block fluid flow from the pump backing line into the manifold in the first position of the sealing member. In some embodiments, the method comprises engaging a sealing device of the sealing member to an internal surface of the manifold to block fluid flow from the sampling interface into the manifold in the second position of the sealing member. In additional examples, the method comprises positioning a sealing device of the internal sealing member to be closer to the second port in the third position of the sealing member. In other embodiments, the method comprises actuating the internal sealing member using a motor. In further embodiments, the method comprises configuring the sealing member with a longitudinal shaft coupled to a plunger at one end and coupled to the motor at an opposite end. In certain examples, the method includes configuring the plunger with a single head or with a double head. In certain embodiments, the method includes configuring the plunger as a longitudinal shaft comprising an outer diameter greater than an outer diameter of the longitudinal shaft. In some embodiments, the method includes configuring the manifold to be a valveless manifold.

In another aspect, a method of operating an inductively coupled plasma spectrometer, the method comprising providing a vacuum manifold comprising a first inlet port and a second inlet port each configured to permit fluid flow into the manifold, the manifold comprising an internal sealing member configured to prevent fluid flow into the manifold from the second port in a first position of the internal sealing member, the internal sealing member further configured to prevent fluid flow into the manifold from the first port in a second position of the internal sealing member, and the internal sealing member further configured to permit fluid flow into the manifold from both the first port and the second port in a third position of the internal sealing member is provided.

In an additional aspect, a method of operating an inductively coupled plasma spectrometer, the method comprising providing a vacuum manifold comprising a housing comprising a first port configured to provide fluidic coupling between a sampling interface line and the manifold; a second port on the housing that is configured to provide fluidic coupling between a pump backing line and the manifold; a third port on a housing that is configured to provide fluidic coupling between a mechanical roughing pump and the manifold; and a moveable sealing member in the vacuum manifold, in which the moveable sealing member comprises a first position effective to permit fluid flow between the first port and the third port and effective to block fluid flow from the second port, in which the moveable sealing member comprises a second position effective to permit fluid flow between the second port and the third port and effective to block fluid flow from the first port, in which the moveable sealing member further comprises a third position effective to permit fluid flow between the first port, the second port and the third port is described.

In another aspect, a method of operating an inductively coupled plasma spectrometer, the method comprising providing a manifold comprising a first port configured to provide fluidic coupling between a sampling interface of the inductively coupled plasma mass spectrometer and a first pump of an inductively coupled plasma mass spectrometer, and comprising a second port configured to provide fluidic coupling between a second pump of the inductively coupled plasma mass spectrometer and the first pump, the manifold comprising an internal sealing member configured to be positioned at a first position in the manifold to block fluid flow between the first pump and the second pump, the internal sealing member further configured to be positioned at a second position in the manifold to block fluid flow between the sampling interface and the first pump, and the internal sealing member further configured to be positioned at a third position in the manifold to permit fluid flow between the sampling interface and the first pump and to permit fluid flow between the second pump and the first pump is disclosed.

In an additional aspect, a method of operating an inductively coupled plasma spectrometer, the method comprising providing a system comprising a manifold comprising a first inlet port, a second inlet port and an outlet port; a first pump fluidically coupled to the outlet port; a second pump fluidically coupled to the first inlet port, a sampling interface fluidically coupled to the second inlet port, in which the manifold further comprises an internal sealing member configured to be positioned at a first position in the manifold to block fluid flow between the first pump and the second pump, the internal sealing member further configured to be positioned at a second position in the manifold to block fluid flow between the sampling interface and the first pump, and the internal sealing member further configured to be positioned at a third position in the manifold to permit fluid flow between the sampling interface and the first pump and to permit fluid flow between the second pump and the first pump.

In another aspect, a method of operating an inductively coupled plasma spectrometer, the method comprising providing a system comprising an ionization device configured to sustain an ionization source, an induction device configured to provide energy to the ionization device to sustain the ionization source in the ionization device, a manifold comprising a first inlet port, a second inlet port and an outlet port; a first pump fluidically coupled to the outlet port, a second pump fluidically coupled to the first inlet port; a sampling interface fluidically coupled to the second inlet port and to the ionization device, in which the manifold further comprises an internal sealing member configured to be positioned at a first position in the manifold to block fluid flow between the first pump and the second pump, the internal sealing member further configured to be positioned at a second position in the manifold to block fluid flow between the sampling interface and the first pump, and the internal sealing member further configured to be positioned at a third position in the manifold to permit fluid flow between the sampling interface and the first pump and to permit fluid flow between the second pump and the first pump is provided.

In an additional aspect, a method of operating an inductively coupled plasma mass spectrometer comprising is provided. In certain examples, the method comprises actuating an internal sealing member of a vacuum manifold between a first position effective to block fluid flow from a pump backing line into the manifold to a second position effective to permit fluid flow from the pump backing line into the manifold and effective to block fluid flow from an interface line into the manifold, reducing the pressure in the mass spectrometer using at least one pump, igniting an ionization source, e.g., an inductively coupled plasma, actuating the internal sealing member away from the second position to provide a fluid leak that permits fluid from the interface line to flow into the vacuum manifold, monitoring current draw of a turbomolecular pump of the mass spectrometer, and actuating the internal sealing member from the second position toward a final position after the current draw of the turbomolecular pump stabilizes.

In certain embodiments, the method can include stopping actuation of the internal sealing member away from the second position if the monitored current draw of the turbomolecular pump exceeds a current limit. In some embodiments, the method can include reinitiating actuation of the internal sealing member toward the final position once the monitored current draw is below the current limit.

In another aspect, a kit comprising one or more of the manifolds described herein, optionally with a software program, electrical harness, actuator or other components desired to permit operation of the manifold in a mass spectrometer system are also provided.

Additional aspects, embodiments, configurations, features and attributes of the manifolds are described herein.

BRIEF DESCRIPTION OF THE FIGURES

Certain figures are described below to illustrate further some of the attributes of the technology described herein, in which.

It will be recognized by the person of ordinary skill in the art, given the benefit of this disclosure, that certain elements in the figures may be shown in an enlarged, distorted or disproportionate manner to facilitate a better understanding of certain embodiments and configurations. Unless otherwise specified in the description, no particular size, dimensions, materials or shapes are intended to be required.

DETAILED DESCRIPTION

Certain embodiments described herein can permit fluid flow through a system in a desired manner. In certain configurations, the manifolds described herein can be configured to permit fluid flow between two or more ports of the manifold. While certain configurations are described herein as permitting fluid flow between two or more ports, the fluidic conductance in the manifold may vary depending on the overall configuration of the system and the exact position or configuration of the manifold in the system. In some embodiments, the sealing members described herein are described as including separate portions or components for ease of description. It will be recognized by the person of ordinary skill in the art, given the benefit of this disclosure, that the sealing member may generally be considered an integral device with no defined separation or demarcation between the heads or ends and the connecting members. Where the sealing member is described as being moved or moveable, the sealing member may be translated or physically displaced in one or more dimensions to seal off a desired port or ports in the manifold or permit fluid flow into the manifold through selected ports.

Figure 1A:
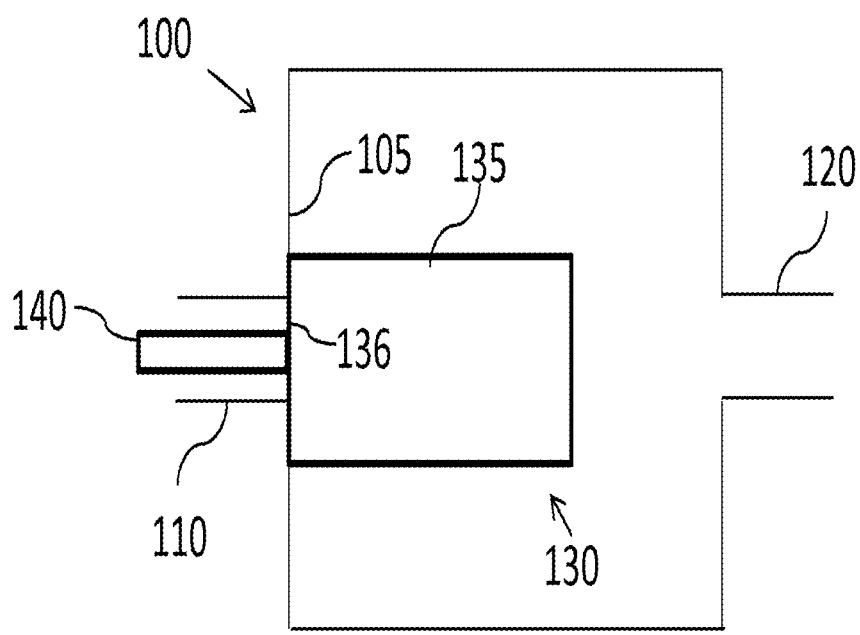
FIGS. 1A-1C are illustrations of a manifold comprising two ports and an internal sealing member, in accordance with certain examples.

In certain examples, the manifolds described herein can include two or more ports that can be used to provide fluidic coupling between other components in a system. For example, where a first fluid line is coupled to a first port on the manifold, the manifold may permit fluid flow between the first port and a second fluid line that is fluidically coupled to a second port on the manifold. In some configuration, fluid flow from the first fluid line can be stopped by adjusting a position of a sealing member in the manifold. For example, a sealing member within the manifold can be moved to an effective position to prevent fluid flow from the first fluid line from being provided to the second fluid line. In instances where such fluid flow is halted, the sealing member may halt fluid flow within the manifold such that some portion of fluid from the first fluid line enters the manifold, but such fluid is not provided to the second fluid line through the second port. Referring to FIG. 1A, an illustration of a manifold 100 comprising a first port 110, a second port 120 and an internal sealing member 130 is shown. The exact distance between the ports of the manifolds described herein may vary. For example, from the port 110 to the port 120, the total distance may be about 5 mm to about 30 mm, for example, about 10 mm to about 20 mm, e.g., about 12, 13, 14 or 15 mm. While the ports 110 and 120 (and other ports described herein) are shown as projecting outward from the manifold 100 for ease of reference, the ports are generally flush with the surface of the manifold 100, and a fluid line can couple to the port to permit fluid flow from the coupled fluid line into the manifold 100. The sealing member 130 includes a first portion or head 135 within the interior of the manifold 100 and a second portion 140 that protrudes through the manifold 100. When the head 135 of the sealing member 130 is placed adjacent to the first port 110 and contacts an inner surface 105 of the manifold 100, a substantially fluid tight seal is provided between the surface 132 of the sealing member head 135 and the surface 105 of the manifold 100 such that no fluid flows into the manifold from the port 110. This configuration stops fluid flow between the ports 110 and 120. While not shown, the surface 136 of the head 135 of the internal sealing member 130 can include a gasket, a membrane, an elastomer or a film that is forced into contact with the surface 105 to enhance the substantially fluid tight seal between the surfaces 105 and 136.

Figure 1B:
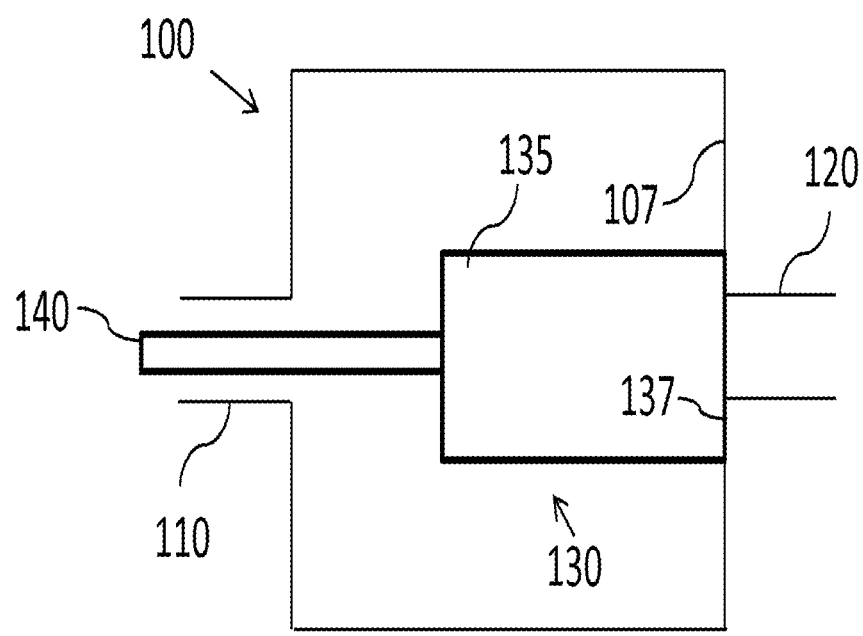

In certain embodiments, the second portion 140 of the sealing member 130 can be configured as a longitudinal shaft or rod that can be coupled to a motor or actuator that is effective to displace or translate the sealing member 130 from one position to another by rotation of the longitudinal shaft. Referring to FIG. 1B, the sealing member 130 has been moved to provide a seal between a surface 137 of the sealing member head 135 and a surface 107 of the manifold 100. Fluid flow from the first port 110 is not provided to the port 120 as the surface 136 of the sealing member prevents fluid in the manifold 100 from flowing into the port 120. This configuration also stops fluid flow between the ports 110 and 120. In the configuration shown in FIG. 1B, fluid from the first port 110 may flow into internal space within the manifold 100 but does not exit the manifold 100 through the port 120. While not shown, the surface 137 of the head 135 of the internal sealing member 130 can include a gasket, a membrane, an elastomer or a film that is forced into contact with the surface 107 to enhance the substantially fluid tight seal between the surfaces 107 and 137.

Figure 1C:
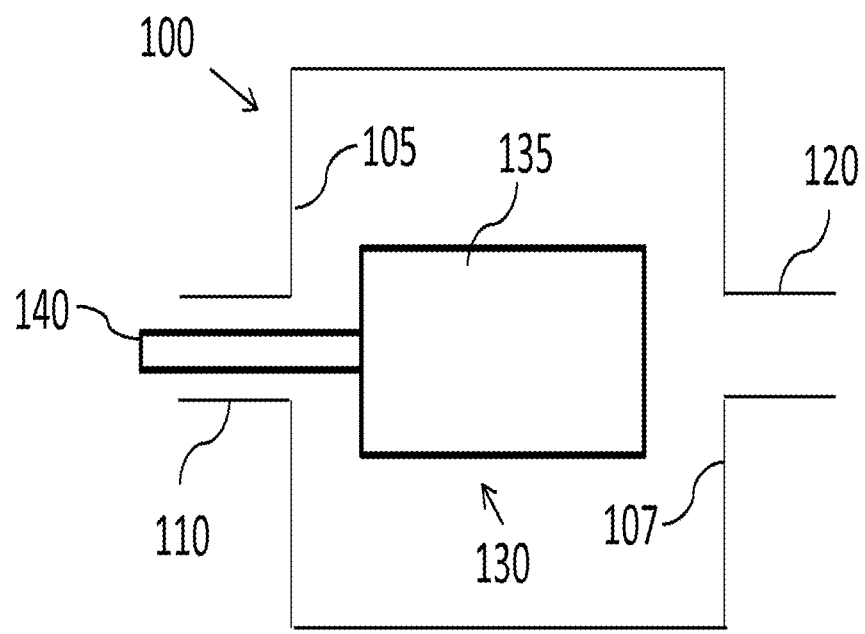

In certain examples and referring to FIG. 1C, a position of the sealing member 130 is shown that permits fluid flow between the ports 110 and 120. The head 135 of the sealing member 130 is shown as being positioned away from the surfaces 105 and 107 of the manifold 100. Fluid may enter the manifold 100 through the port 110 and can flow out of the manifold 100 through the port 120. Depending on the selected position of the sealing member 130, the fluidic conductance within the manifold 100 may vary. For example, the sealing member 130 can be positioned closer to the first port 110 or the second port 120 to alter the overall fluidic conductance within the manifold. For example, a fluidic conductance of about 10-15 L/S may be suitable, e.g., about 13 L/S may be used. In some embodiments, the head 135 of the internal sealing member 130 can be positioned closer to the port 110, whereas in other examples, the head 135 of the manifold 130 can be positioned closer to the port 120.

In certain configurations, the internal sealing member 120 can be coupled to a stepper motor or actuator through portion 140 that can be used to adjust the position of the head 135 between those shown in FIGS. 1A and 1B. For example, a stepper motor (not shown) can be moved a known number of steps to move the head 135 from the position shown in FIG. 1A to the position shown in FIG. 1B. When the desired number of steps has been performed, the seal between surfaces 107 and 137 should be provided. To move the head 135 to the position shown in FIG. 1C, the stepper motor may move the head 135 back a selected number of steps to permit a desired fluid flow through the manifold 100. In some embodiments of the manifolds described herein, the final position of the head 135 can be user-selected or user-adjustable to provide desired fluid flow characteristics within the manifold 100. In other embodiments, the positions of the head 135 can be programmed into a processor or memory unit (or hard coded into firmware) such that the positions and steps implemented are determined by the firmware and are not generally user adjustable. If desired, the motor or actuator can be a binary device with three defined stop positions to position the sealing member 135 at two positions including a first position adjacent to the port 110, and a second position adjacent to the port 120.

In certain embodiments, the manifold 100 can be configured as a valveless manifold where no mechanical valves, e.g., solenoid valves, are present or used to control fluid flow into or within the manifold. In contrast to manifolds with mechanical valves, manifolds using the internal sealing members described herein can be produced at reduced cost, can have longer usable lifetimes and require fewer controls. If desired, valves can be included on or in one or more ports of the manifold to provide for further control of fluid flow in the system.

In certain embodiments, the exact dimensions of the ports 110 and 120 may vary, and in certain embodiments, the ports may be sized substantially the same whereas in other embodiments the ports may be sized differently. Where the ports are sized differently, the final position of the head 135 may be adjusted to provide a similar fluid flow through the manifold compared to the flow that results where the ports 110 and 120 are substantially the same size and dimensions. In some embodiments, the ports 110 and 120 may independently each be about 5 mm to about 50 mm, more particularly about 10 mm to about 40 mm, for example, about 15 mm to about 40 mm.

In some configurations, the exact shapes and dimensions of the head 135 of the sealing member 130 may vary. For example, the shape and length of the head 135 may vary depending on the number of ports in the manifold 100, the desired fluid flow within the manifold 100, the overall form factor of the manifold 100 or other desired features. In some embodiments, the head 135 generally takes the form of a cylinder whose cross-sectional diameter is larger than the cross-sectional diameter of a port that the head 135 is intended to seal. For example, the cross-sectional diameter of the surface 136 of the head 135 may be an effective diameter to provide the substantially fluid tight seal when the surface 136 is engaged to the surface 105 or when the surface 137 is engaged to the surface 107. In some embodiments, the cross-sectional diameter of the head 135 may be about 5% larger than the cross-sectional diameter than the larger of the ports 110 and 120. In other embodiments, the cross-sectional diameter can be about 10% larger than the larger cross-sectional diameter of the ports 110 and 120.

Figure 2A:
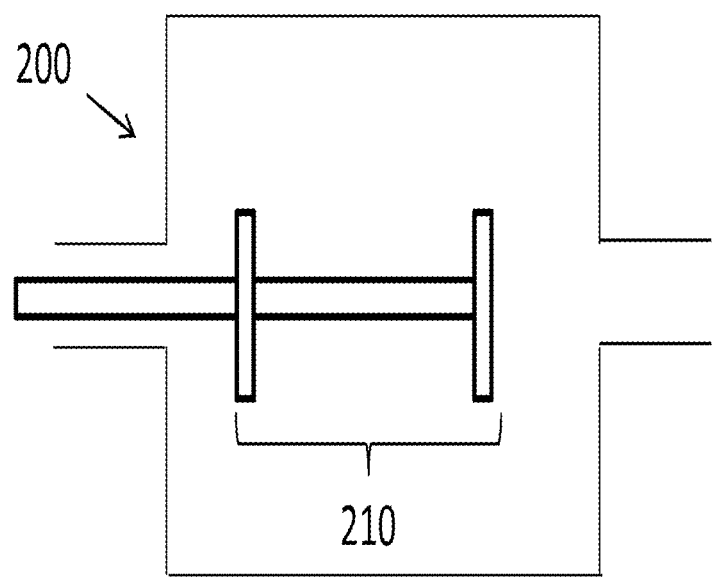
FIG. 2A is an illustration of a manifold comprising a dumbbell shape, in accordance with certain examples.

In some instances, the sealing member may take the shape of a dumbbell 210 as shown in FIG. 2A. The dumbbell shape is generally characterized as including terminal portions that had a larger diameter than a middle connecting portion. The terminal portions can be sized and arranged to provide a substantially fluid tight seal when the terminal portions engage the internal surfaces of the manifold. If desired the terminal portions may each be disk shaped as shown in FIG. 2A, or the edges of the terminal portions can be rounded or curved to facilitate better fluid flow within the manifold 200.

Figure 2B:
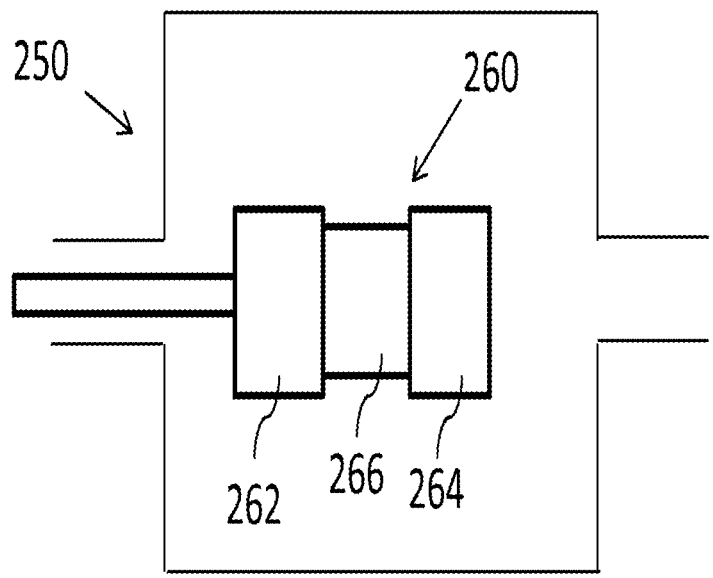
FIG. 2B is an illustration of a manifold comprising a double-headed plunger, in accordance with certain examples.

In certain configurations, the sealing member can comprise a double-headed plunger shape with a connecting portion having a smaller diameter than terminal portions. Referring to FIG. 2B, a double-headed plunger shape 260 is shown in a manifold 250. The double-headed plunger comprises terminal portions or plunger heads 262 and 264 which have a larger diameter than a connecting portion 266. Surfaces of the terminal portions 262 and 264 can seal to the ports of the manifold 250 to prohibit fluid flow between the two ports. If desired, the terminal portions 262 and 264 can be concave in shape such that an outer rim or ring of the plunger heads are effective to engage the inner surface of the manifold to seal off one of the ports.

In some instances, the sealing members described herein may generally be solid bodies without any void space within them. In other instances, the sealing members can be hollow or have open space within them to reduce their weight or reduce overall cost of manufacturing the sealing member. If desired, one or more areas or portions of the sealing member can be weighted, angled, tipped or otherwise configured in some desired manner.

In certain embodiments, the sealing member can comprise a generally inert material that will not react or interfere with the fluid or species in the fluid that flow through the manifold. In some embodiments, the sealing member can comprise one or more of a plastic, a stainless steel, polytetrafluoroethylene, an aluminum, titanium, an Inconel alloy, passivated aluminum, a perfluoroelastomer, a refractory material (e.g., alumina), an inert elastomer or rubber material (e.g., Viton® fluoroelastomer) or other similar materials. In some embodiments, the sealing member can include a body produced from one material and a covering or coating of another material. For example, the sealing member body can be produced from a steel or non-inert plastic, which can be covered or coated with a perfluoroelastomer to provide inertness to the sealing member.

Figure 3A:
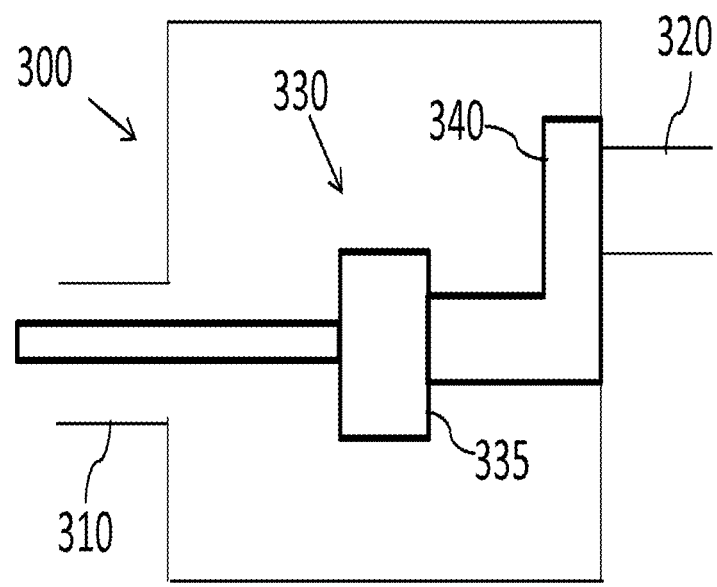
FIGS. 3A and 3B are illustrations of manifolds comprising offset ports, in accordance with certain examples.
Figure 3B:
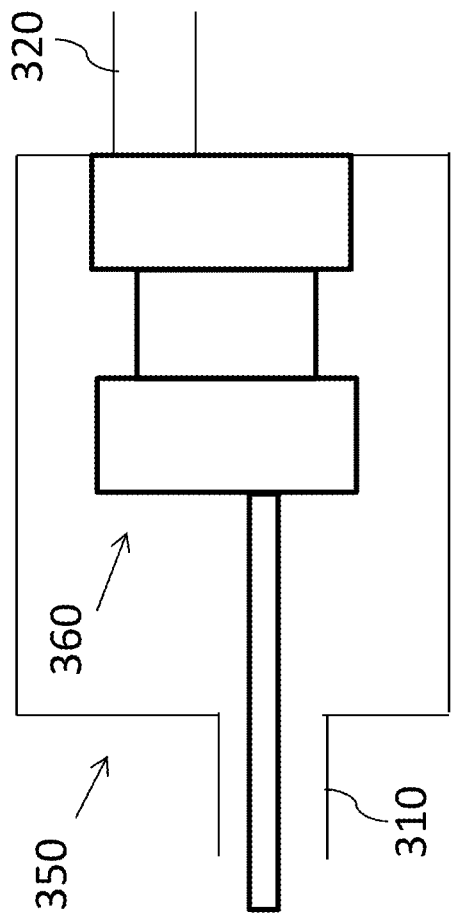

In certain embodiments, the ports of the manifolds described herein need not be in the same plane of the manifold. Referring to FIG. 3A, an illustration of a manifold 300 is shown where a first port 310 is offset from a second port 320. The manifold 300 comprises a sealing member 330 with a first head 335 configured to seal or mate to the first port 310, and a second head 340 offset from the first head 335 and configured to mate or seal to the second port 320. If desired the heads 335 and 340 can be large enough so they are not offset from each other but are large enough to seal to the ports 310 and 320 depending on the position of the sealing member 330. For example, a sealing member 360 is shown in the manifold 350 of FIG. 3B that has heads sized and arranged to seal to ports 310 and 320 depending on the position of the sealing member 360.

Figure 4A:
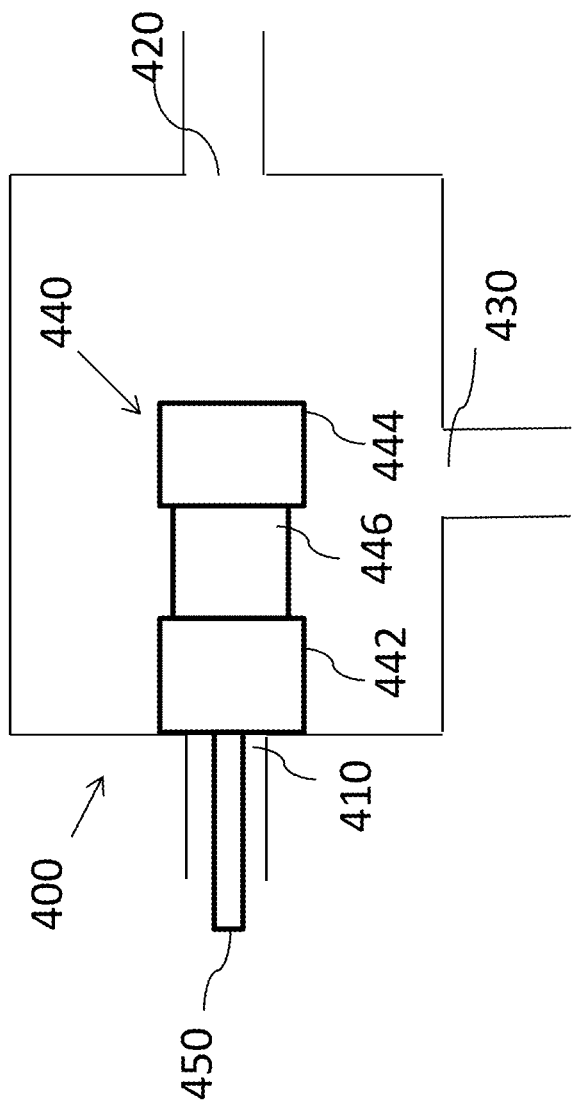
FIGS. 4A-4C are illustration of a manifold comprising three ports and an internal sealing member, in accordance with certain examples.

In certain examples, the manifolds described herein can be used to permit fluid flow, or stop fluid flow, between more than two fluid flow lines in a system. One configuration of a three port manifold is shown in FIG. 4A that can be used to control fluid flow between three different fluid lines. The manifold 400 comprises a first port 410, a second port 420, and a third port 430. An internal sealing member 440 comprises a first head 442, a second head 444, and a connecting portion 446. The sealing member 440 comprises a connecting rod 450 that can be coupled to a motor or actuator configured to move the sealing member 440 within the manifold 400. If desired, the motor or actuator can be configured as a ternary device with three pre-determined stop positions including a first position to place the sealing member 440 adjacent to the port 410, a second position to place the sealing member adjacent to the port 420 and a third position to place the sealing member between the first port 410 and the second port 420. As shown in FIG. 4A, the sealing member 440 is engaged to the surface of the port 410 to prevent fluid flow from the fluid line coupled to the port 410 into the manifold 400. In the position of the sealing member 440 shown in FIG. 4A, fluid may be permitted to flow between the ports 420 and 430.

Figure 4B:
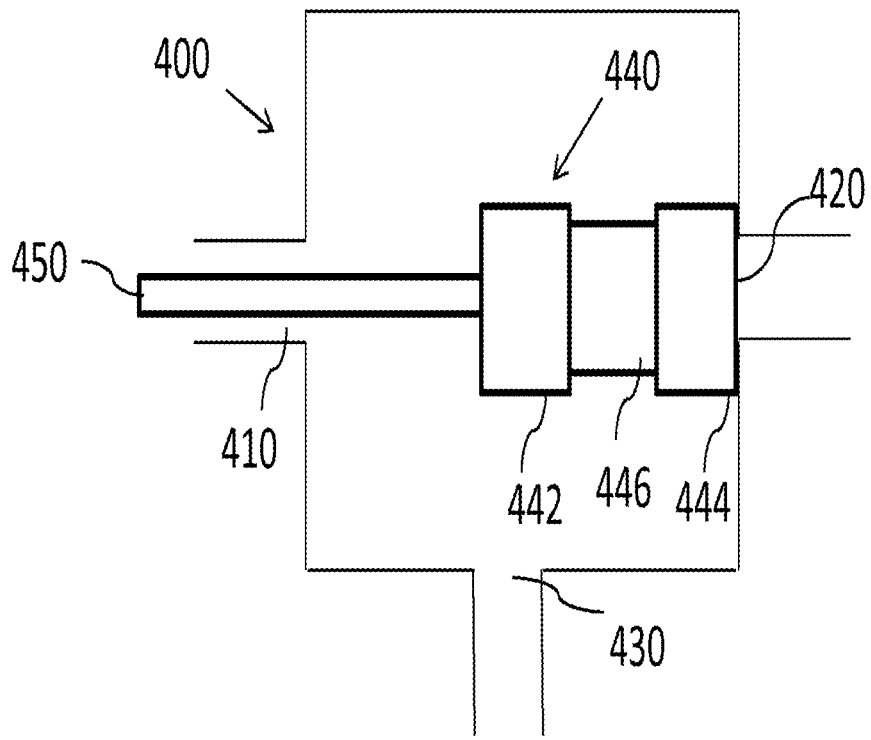
Figure 4C:
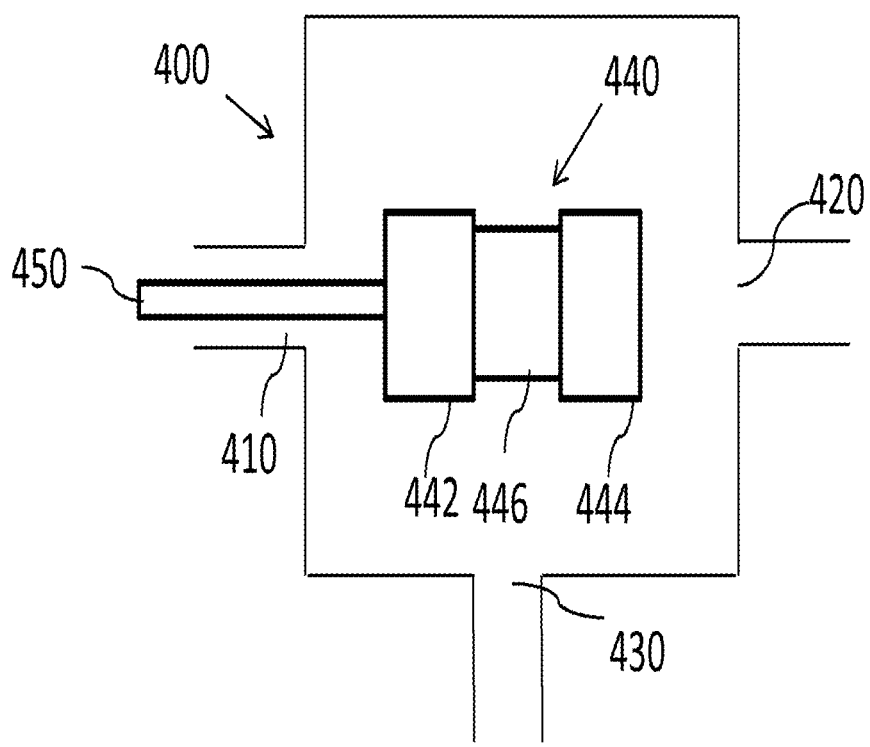

In some embodiments and referring to FIG. 4B, the position of the sealing member 440 can be adjusted such that the head 444 is engaged to the port 420. In this position, fluid is prevented from flowing into the manifold 400 from the port 420 or flowing out of the manifold 400 through the port 420. Fluid can flow between the ports 410 and 430. Referring now to FIG. 4C, the sealing member 430 has been moved from the position that engages the second port 420 to a position within the manifold 400. Fluid may now flow between the three ports 410, 420 and 430 of the manifold 400. Without wishing to be bound by any particular theory, fluid may generally flow down its pressure gradient with fluid flowing from higher pressure toward lower pressure. Thus, depending on the pressure in each of the fluid lines, fluid may flow from one or more of the ports 410, 420 and 430 to one or more other ports 410, 420, 430. Examples of manifolds including three ports and used and with three different fluid flow lines are described in more detail below.

Figure 5:
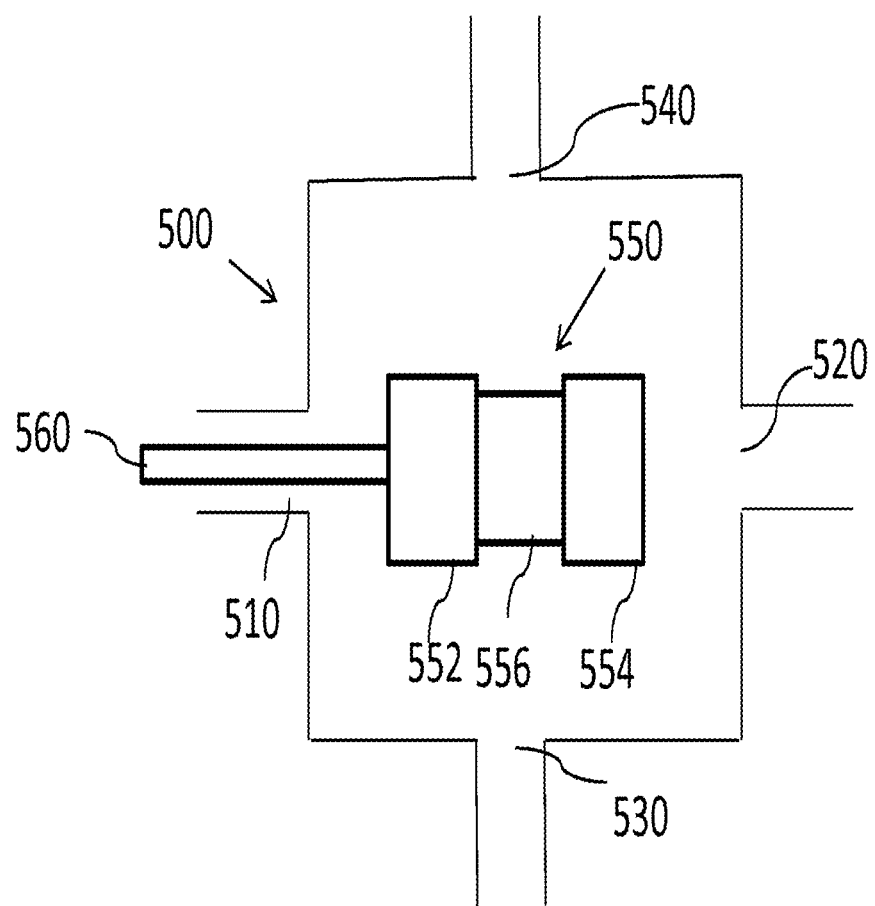
FIG. 5 is an illustration of a manifold comprising four ports, in accordance with certain examples.

In certain embodiments and referring to FIG. 5, a manifold 500 comprising a first port 510, a second port 520, a third port 530 and a fourth port 540 is shown. The manifold 500 includes an internal sealing member 550 including a first head 552, a second head 554 and a connecting portion 556. The sealing member 550 is coupled to a rod or shaft 560 which can be coupled to a motor or actuator that can move the sealing member 550 within the manifold 500. The position shown in FIG. 5 permits fluid flow between all of the ports 510, 520, 530 and 540. In some configurations, the sealing member 550 can be engaged to the port 510 such that fluid only flows between ports 520, 530 and 540. In other instances, the sealing member 550 can be engaged to the port 520 such that fluid only flows between ports 510, 530 and 540. Depending on the position 550 of the sealing member, the fluidic conductance at each of the ports 510, 520, 530 and 540 may vary.

Figure 6A:
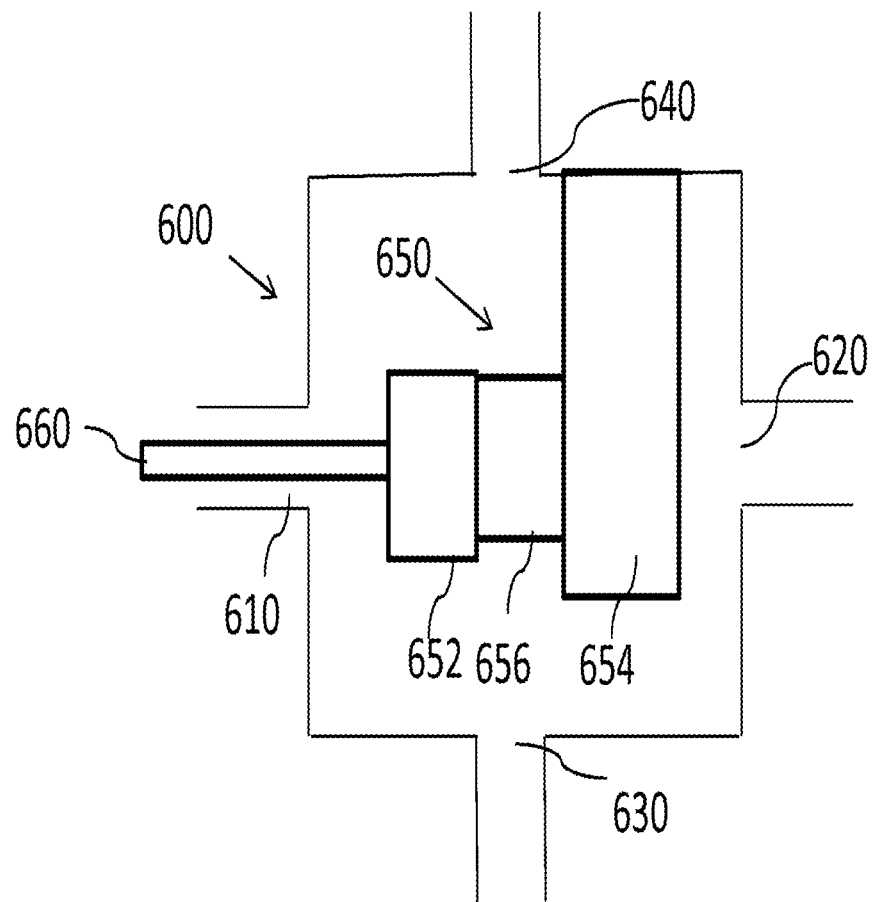
FIGS. 6A and 6B are illustrations of a manifold comprising a sealing member that can block two ports, in accordance with certain examples.
Figure 6B:
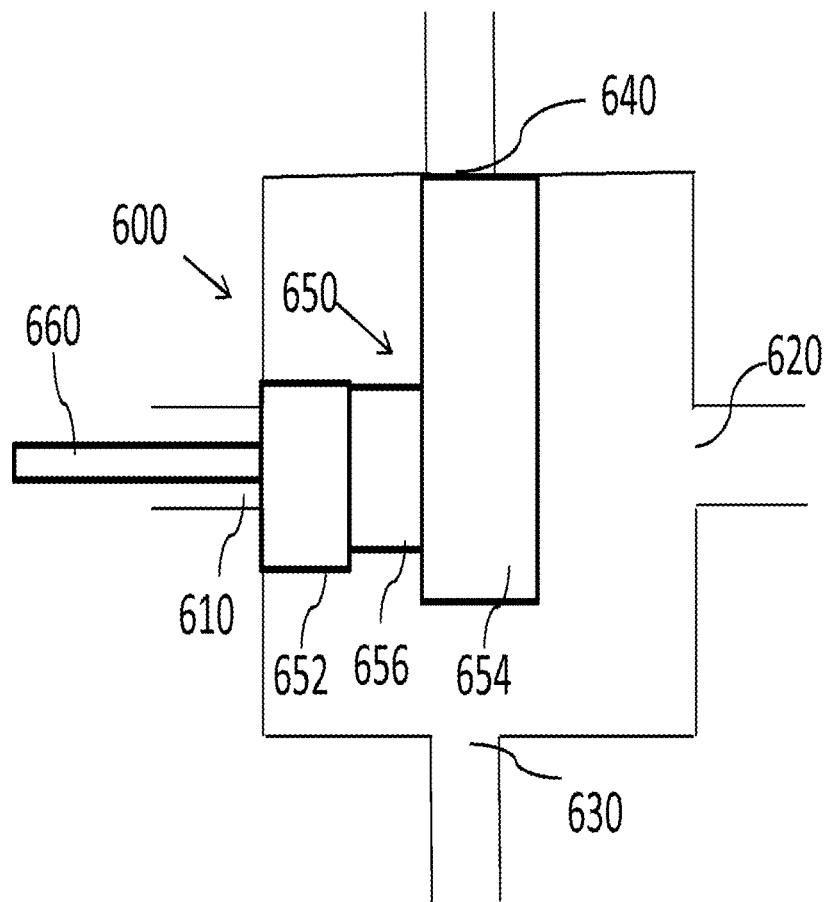

In certain embodiments, the internal sealing member can be configured such that fluid flow between fewer than three ports may occur in a manifold comprising four or more ports. Referring to FIG. 6, a manifold 600 is shown that comprises a first port 610, a second port 620, a third port 630 and a fourth port 640 is shown. The manifold 600 includes an internal sealing member 650 including a first head 652, a second head 654 and a connecting portion 656. The sealing member 650 is coupled to a rod or shaft 660 which can be coupled to a motor or actuator that can move the sealing member 650 within the manifold 600. The position shown in FIG. 6A permits fluid flow between all of the ports 610, 620, 630 and 640. In some configurations, the sealing member 650 can be moved to engage the ports 610 and 640 to prevent fluid flow into the manifold 600 as shown in FIG. 6B. The head 654 is sized and arranged such that it glides along the interior surface of the manifold 600 and blocks the port 640 when the head 652 blocks the port 610. In this configuration, fluid may be permitted to flow between the ports 620 and 630, but fluid does not flow into the manifold from the ports 610 or 640. A similarly configured sealing member as sealing member 650 may be used in connection with three ports manifold, five port manifolds or manifold including more than five ports. In addition, other configurations, e.g., where the sealing member is configured to block ports across from each other, can also be used to provide desired fluid flow into or out of the manifold.

Figure 7A:
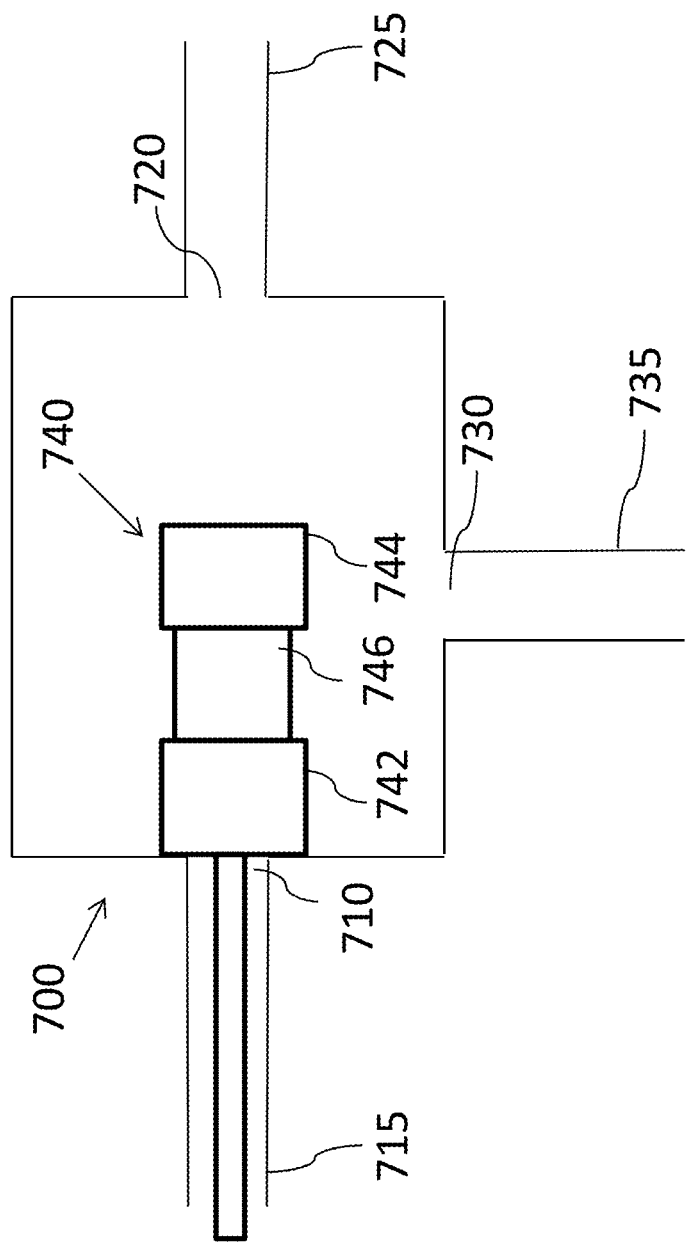
FIGS. 7A-7D are illustrations showing a three port manifold, in accordance with certain examples.
Figure 7B:
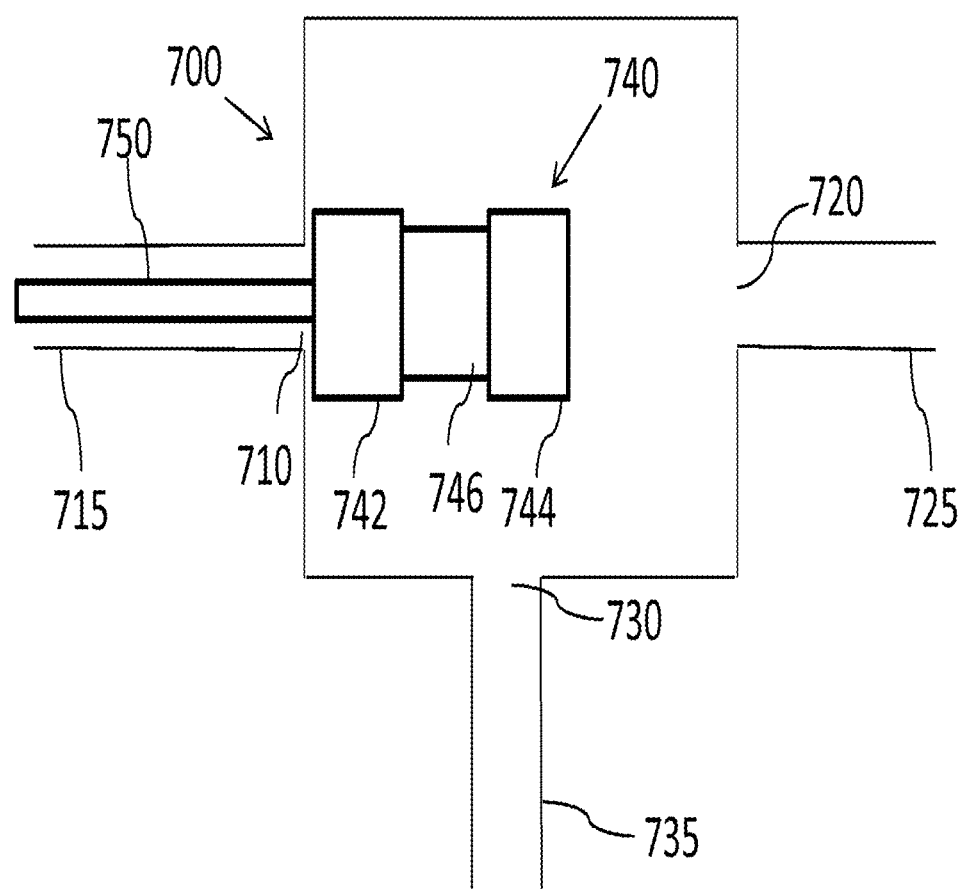
Figure 7C:
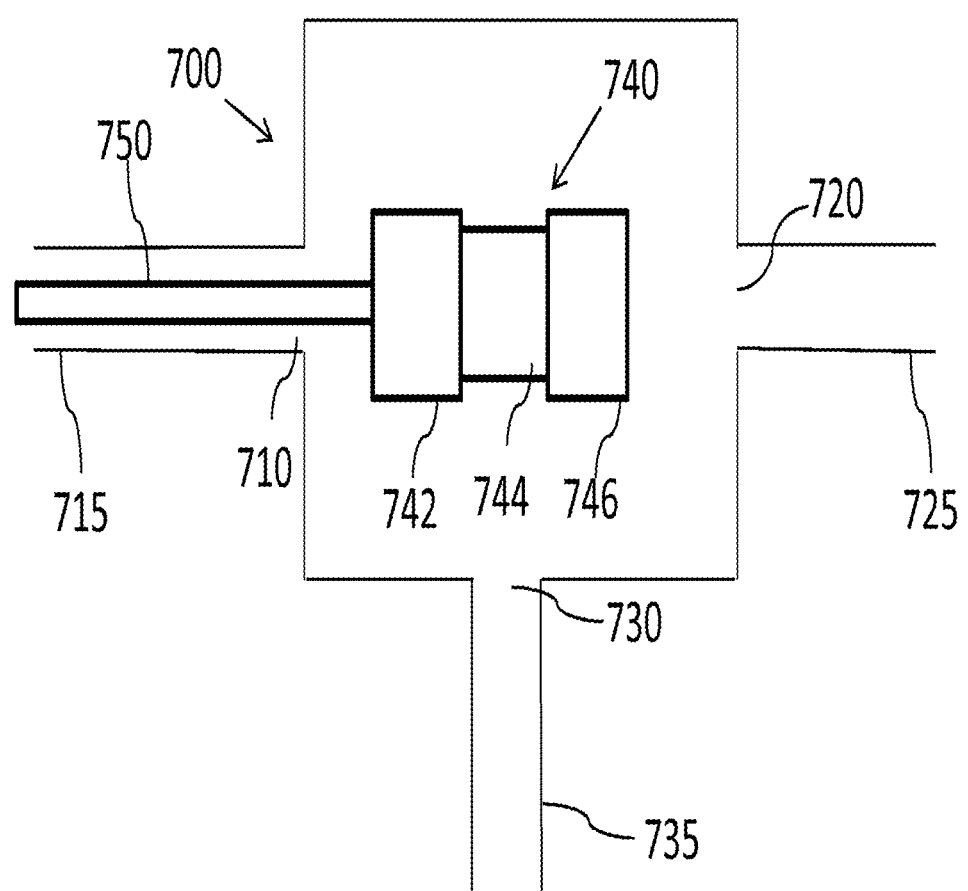

In certain embodiments, the exact positioning and control of the sealing member may vary depending on the system where the manifold is present. If the pressures in different fluid lines that couple to different ports vary substantially, then it may be desirable to move or remove one head of the sealing member slowly from a particular port. Referring to FIG. 7A, a manifold 700 comprises ports 710, 720 and 730 coupled to fluid flow lines 715, 725 and 735, respectively. The manifold 700 comprises a sealing member 740 comprising a first head 742, second head 744 and connecting member 746. As shown in FIG. 7A, the head 742 of the sealing member 740 sits adjacent to the port 710 to prevent fluid from flowing into the manifold 700 through the port 710. Where the pressure in the fluid line 710 is substantially greater than the pressure inside the manifold 700 or within the lines 725, 735, it may be desirable to move the sealing member 740 gradually away from the port 710 to permit fluid flow into the manifold 700. For example, rapid movement of the sealing member 740 away from the port 710 may result in rapid flow of fluid into the manifold 700. Such rapid flow may not be desired in some instances as that could lead to undesirable pressure fluctuations. To reduce the flow into the manifold 700, the sealing member 740 can be moved slightly away from the port 710, e.g., 1-5 steps using a stepper motor, to permit leaking of fluid into the manifold 700 from the port 710 as shown in FIG. 7B around the head 742 of the sealing member 740. After a desired period, the sealing member 740 can be moved incrementally further away from the port 710 to permit additional fluid to flow into the manifold 700, as shown in FIG. 7C.

In certain embodiments, the resting or end position of the sealing member 740 depends on the selected fluidic conductance for the various ports of the manifold. If desired, the sealing member can be positioned to balance the fluid load at the ports or to account for different fluid loads through the ports. By positioning the sealing member at a desired position, the cross-sectional area of a particular fluid path through a port can be reduced (where the sealing member is closer to the port) or can be increased (where the sealing member is further away from the port).

Figure 7D:
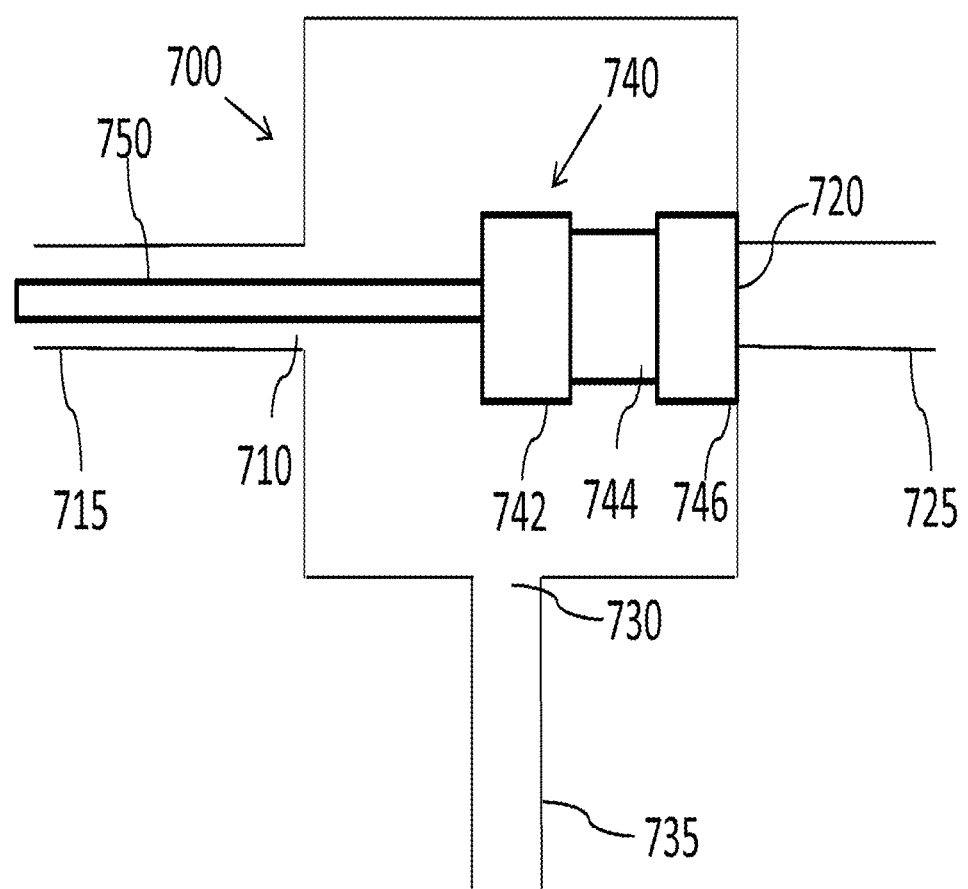

In some embodiment, the final position of the sealing member where all ports are open may be determined based on the number of steps undertaken by a stepper motor. For example, the position shown in FIG. 7A may be arbitrarily considered the zero position of the stepper motor. To provide the leaking shown in FIG. 7B, the motor can move about 1-5 steps. The final position of the motor may be determined by the number of steps from the position shown in FIG. 7B, e.g., 500 additional steps may be used to position the sealing member at its final position. In certain embodiments, the number of steps the motor is actuated can be used to determine when a port is sealed to the sealing member. For example and referring again to FIG. 7A, the position of the sealing member 740 sealed to the port 710 can be considered the zero position. The motor can be actuated a fixed number of steps, e.g., 1000, after which the sealing member 740 should be engaged to the port 720 as shown in FIG. 7D. In this manner, the number of steps can be used to determine when the sealing member 740 is engaged to a particular port without the need for including pressure sensors or flow sensors in the manifold, though such sensors could be present if desired.

In certain embodiments, the manifold housing can be produced using generally inert materials to avoid unwanted reactions or interferences with the sample. For example, the manifold housing can be produced using stainless steel, passivated aluminum, titanium, Inconel® alloys, perfluoroelastomers, inert plastics and the like. In some embodiments, the entire housing of the manifold may be produced from these materials, whereas in other examples inner surfaces of the manifold that are exposed to fluid may include these materials and outer surfaces of the manifold can include materials other than the illustrative ones listed here, e.g., steel or non-inert plastics. In some embodiments, the longitudinal shaft of the sealing member can be sealed or shielded from any fluid by surrounding it with a bellows assembly, a membrane, a film, a wrap or otherwise using one or more devices or materials to prevent fluid from contacting the longitudinal shaft.

Figure 8:
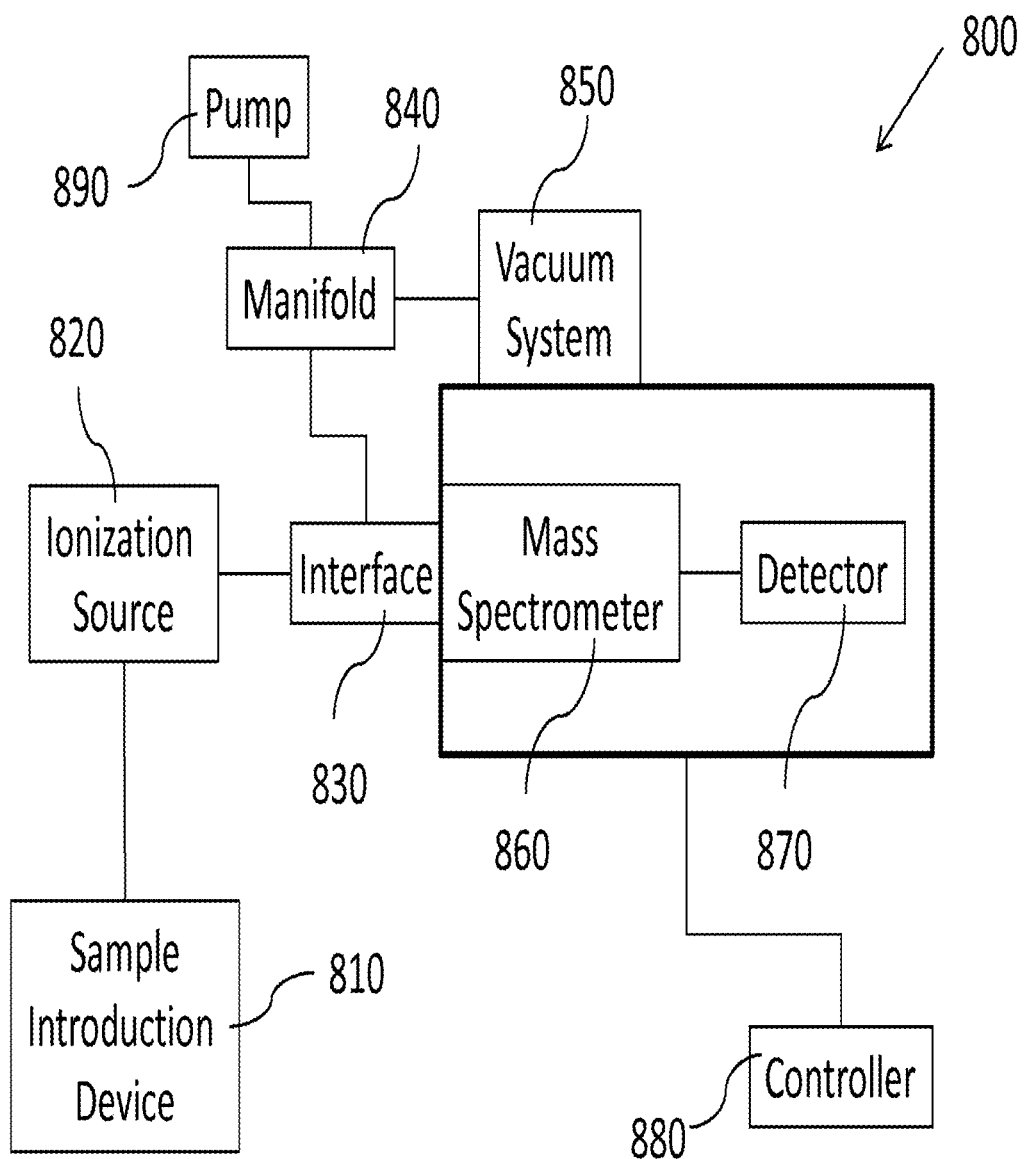
FIG. 8 is a block diagram of some components in a mass spectrometer, in accordance with certain examples.

In certain embodiments, the manifolds described herein can be used in a mass spectrometer to control the gating of an interface port and one or more other ports, e.g., a roughing pump port and a turbomolecular pump port. A basic block diagram of a mass spectrometer system is shown in FIG. 8. The system 800 comprises a sample introduction device 800, an ionization source 820, an interface 830, a manifold 840, a vacuum system 850, a mass spectrometer 860, a detector 870, a controller 880 and a pump 890. The sample introduction device 810 generally is effective to receive a liquid sample and provide small droplets of the liquid sample in the form of an aerosol. A nebulizer is typically present in the sample introduction device 810 to provide the aerosolized form of a sample. In certain embodiments, the nebulizer may be a concentric nebulizer, a cross-flow nebulizer, a Babington nebulizer or other suitable nebulizers. The sample introduction device 810 may also include a spray chamber, e.g., a Scott or Cyclonic spray chamber, prior to being provided to the ionization source 820. The spray chamber can be used to provide smaller droplets to the ionization source 820, which can create fewer analytical problems than when large droplets are provided to the ionization source 820.

In certain embodiments, the ionization source 820 is effective to receive the sample and atomize and ionize the species in the sample. The ionization source may also be effective to dry the sample by removing the solvent. Where the ionization source takes the form of an inductively coupled plasma, the ionization source can include a torch, e.g., a Fassel-type torch, and one or more inductive devices electrically coupled to a generator to provide radio frequency energy to the torch. For example, the inductive device may be a helical coil, a flat plate electrode or other suitable induction devices as described, for example, in commonly assigned U.S. Pat. No. 7,511,246. In other configurations, the ionization source may be a flame, a spark, an arc, a glow discharge or other suitable sources that can ionize sample received from the sample introduction device 810.

In certain examples, the interface 830 is generally configured to permit the ionization source and a lens system to function together. The ionization source is typically at high temperature and atmospheric pressure, which is substantially larger than the pressure of the mass spectrometer 860. In certain embodiments, the interface 830 can include one or more cones, e.g., two cones or three cones, and/or one or more lenses or both. For example, sample can enter into the interface 830 from the ionization source 820, and the cones can sample and skim or focus the ion beam and reduce the pressure. Reduction in pressure can result in expansion of the ion beam.

In certain embodiments, the manifold 840 may be any of the manifolds described herein. The manifold 840 is shown as being fluidically coupled to the interface 830, a chamber vacuum system 850 and a pump 890. While shown as a separate element for ease of description, the vacuum system 850 may be considered part of the mass spectrometer chamber. The vacuum system 850 can be fluidically coupled to the manifold in many ways and certain illustrations are described below in reference to FIGS. 9A-9C. The distance between the interface 830 and the detector 870 is often around 1 meter. Any ions entering the mass spectrometer 860 must not collide with other molecules to reach the detector 870. The vacuum system 850 removes gas molecules in the mass spectrometer 860 to increase the mean free ion path (average distance travelled by ions between collisions) and reduce the likelihood of unwanted collisions between analyte and gases in the mass spectrometer 860. The vacuum system 850 typically includes a turbomolecular pump. The turbomolecular pump operates similar to a jet turbine and can rapidly pump a chamber to a pressure of about $10^{-5}$ Torr or less. A roughing pump 890 backs the turbomolecular pump and evacuates the interface region.

In certain examples, as ions exit the interface region, the sample may include a plurality of ions with different masses. Mass filtering can be used to select the desired ions. For example, a quadrupole is often used to select ions. Depending on the configuration, it may be desirable to turn the desired ions at a right angle while permitting non-ionized species and any photons to travel in a generally straight path.

In some embodiments, the mass spectrometer 860 can include a collision/reaction cell that can be used to remove interferences from the ion beam. For example, polyatomic species having a mass similar to a desired ion can be removed using the collision/reaction cell. Illustrative collision/reaction cells and their methods of use are described in commonly assigned US patent application publication 20120091331. When the cell is operated in the collision mode, the interfering species collides with inert gas molecules, which results in removal of the interfering species through kinetic energy discrimination. In the reaction mode, interfering species chemically react with a reactive gas, e.g., ammonia, to provide a product with a different mass than the desired ions.

In certain examples, the mass spectrometer 860 can include a quadrupole mass filter, a time of flight analyzer, an ion trap analyzer, or a magnetic sector analyzer or other suitable device that is effective to separate charged ions by mass. In a typical setup, a quadrupole mass spectrometer is used where voltages and radio frequencies applied to the different rods permit selection of ions with a particular mass-to-charge (m/z) ratio. The quadrupole can be scanned at a selected rate to filter ions of different m/z in the sample. The controller 880 can be used to select a particular m/z ratio or to scan many different m/z ratios.

In some embodiments, the filtered ions from the mass spectrometer are provided to a detector 870. The detector 870 may take many different forms including, but not limited to, electron multipliers, Faraday cups, photographic plates, a scintillation detector or other suitable detectors. In one configuration, the surface of a detector can be configured to release an electronic each time an ion strikes the surface. Electrons released from the first surface strike a second surface which releases more electrons and amplifies the signal. This electron cascade may be continued until a desired signal is provided.

In certain embodiments, the controller 880 typically includes a processor and suitable circuitry to control the various components of the system 800 and receive any signals from the detector 880. In some embodiments, the controller 880 can be configured to control the gas flows of the ionization source 820, the pressure within the mass spectrometer 860 and other parameters of the system 800 that can be adjusted for analysis of a sample. The controller 880 can also be used to control the position of the moveable sealing member of the manifold 840 during operation of the system 800.

Figure 9A:
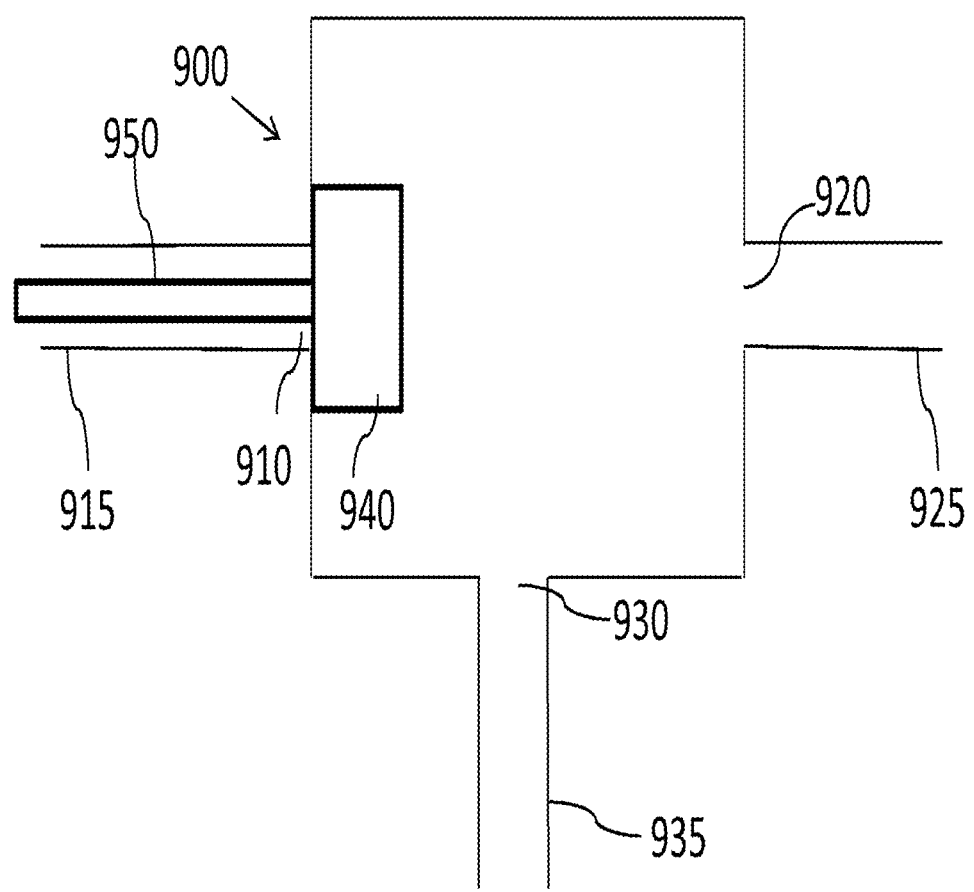
FIGS. 9A-9C are illustrations of a manifold configured for use in a mass spectrometer, in accordance with certain examples.
Figure 9B:
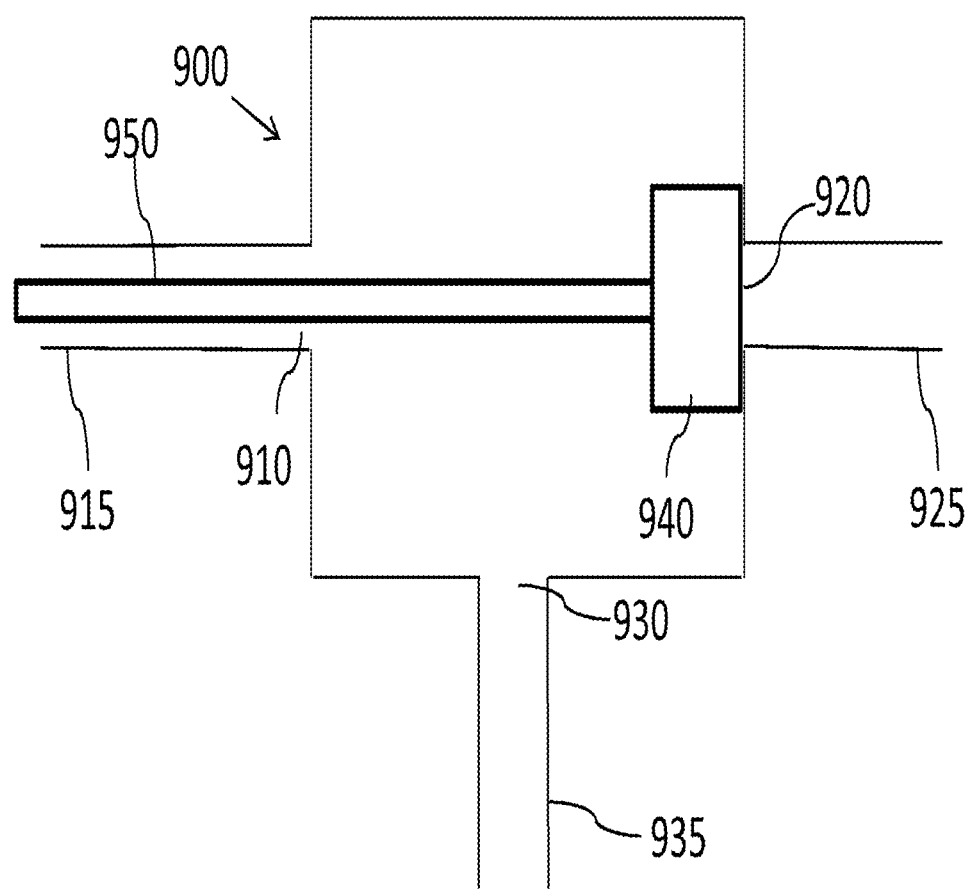
Figure 9C:
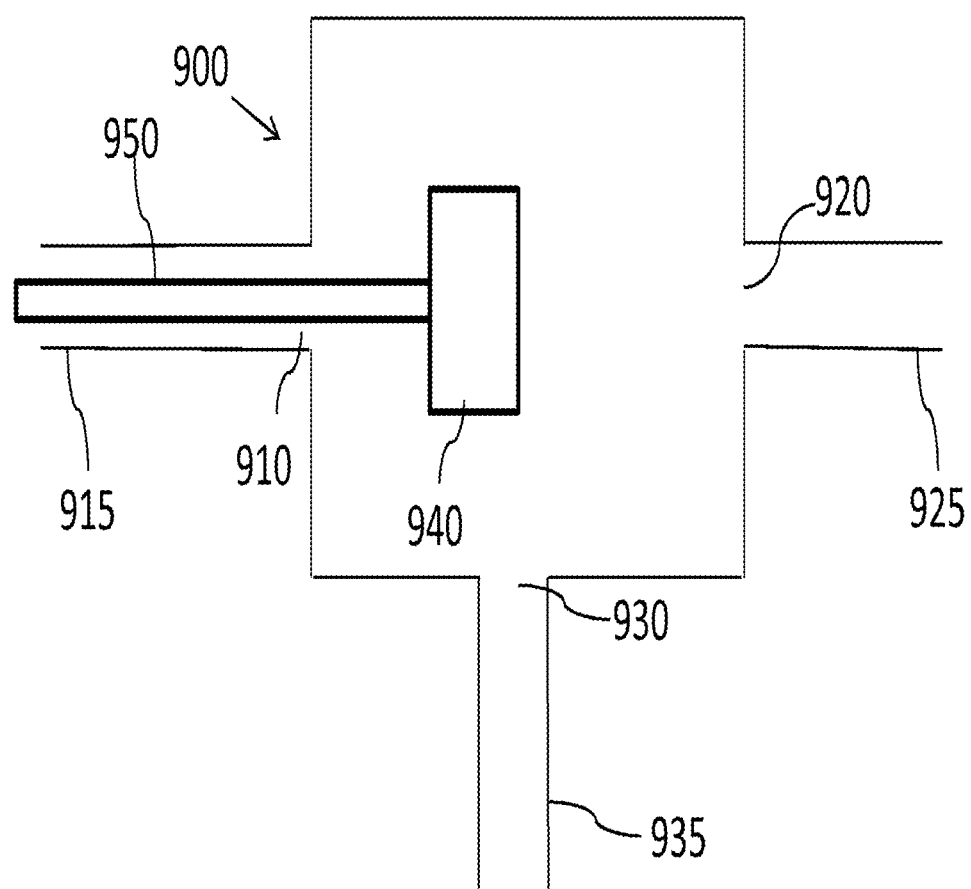

In certain examples and referring to FIG. 9A, a manifold 900 is shown comprising a first port 910 fluidically coupled to a fluid line 915 from a backing line from a turbomolecular pump. The manifold 900 also includes a port 920 fluidically coupled to a fluid line 925 from a sampling interface. The manifold 900 also includes a third port 830 fluidically coupled to a roughing pump. In the off state of the system, a sealing member 940 is shown as being positioned adjacent to the port 910, which prevents fluid from the backing line from entering into the manifold 900. In this configuration, the ionization source of the mass spectrometer is in the off or un-ignited state and the vacuum of the system is off. Referring to FIG. 9B, the disk shaped sealing member 940 can be moved toward the port 920 by actuating a stepper motor (not shown), coupled to the longitudinal shaft or rod 950, a selected number of steps to move the sealing member 940 until it engages the port 920 and provides a substantially fluid tight seal between the port 920 and a face of the sealing member 940. As shown in FIG. 9A, the member 940 is configured as a disk that is positioned orthogonal to the shaft 950. In the position shown in FIG. 9B, the sealing member 940 prevents fluid flow from the interface line into the manifold 900 through the port 920. In the position shown in FIG. 9B, the ionization source is off, but the vacuum of the system is switched on. Referring now to FIG. 9C, the stepper motor has been actuated back a selected number of steps to move the sealing member 940 away from the port 920 and toward the port 910. In the position shown in FIG. 9C, all ports are open and fluid may flow between them. In a typical operation, the ionization source has been ignited and is operational when the sealing member 940 is in the position shown in FIG. 9C. The exact final position of the sealing member 940 may vary depending on the selected fluidic conductance in the system. In some embodiments, the ports 910, 920 and 930 may be sized differently, and the position of the sealing member 940 can be adjusted to account for the differences in size. In certain embodiments, the gas load through port 920 is higher as the sampling interface is typically close to atmospheric pressure. The overall cross-section of the fluid flow path can be controlled by positioning the sealing member 940 closer or further away from the port 920. In certain embodiments, the sealing member 940 can be positioned closer to the port 910 than the port 920 to account for the different fluidic conductance between the various ports 910 and 920. This bias toward the port 910 reduces the overall cross-sectional area of the port 910 and increases the cross-sectional area of the port 920. By positioning the sealing member 940 at a suitable position, the sampling interface pressure can be adjusted such that the skimmer cone of the sampling interface is well within the "zone of silence."

In certain embodiments, the sealing member 940 can include a gasket, O-ring, film, elastomer or other device that can assist in providing a substantially fluid tight seal between the head of the sealing member 940 and the inner surface of the manifold 900 adjacent to a port. The gasket can be compressible such that pressure is exerted by the sealing member 940 on the gasket when the sealing member is positioned to engage a port of the manifold 900. In some embodiments, the actuator coupled to the sealing member can be configured to move the sealing member a desired amount or number of steps to permit the gasket of the sealing member to contact the inner surface of the manifold. To ensure a substantially fluid tight seal, the sealing member can be moved an additional amount to apply pressure against the gasket. For example, once gasket contacts the inner surface of the manifold, a stepper motor can be moved an additional 50-100 steps where the stepper motor is configured to have about 500 steps per one full revolution of the motor. By exerting pressure against the gasket, a desired seal can be created to prevent fluid flow from the particular part that has been sealed.

In certain examples, a manifold such as the one shown in FIGS. 9A-9C can be used to initiate a mass spectrometer. In the off state, the mass spectrometer has no vacuum and no active ionization source, e.g., where the ionization source is a plasma, the plasma is not ignited or sustained within a torch. In one illustrative ignition sequence to ignite the ionization source of the mass spectrometer, the sealing member 940 will be in the position shown in FIG. 9A, which acts to block fluid flow from the backing line into the manifold. The sealing member 940 will then be moved to the other side of the manifold 900 to provide a seal against the port where the interface line couples to the manifold 900. The movement of the sealing member from one port 910 to the other port 920 can be performed within a desired time, e.g., 1-5 seconds. A selected number of steps on the stepper motor can be used to determine that the head of the sealing member 940 has been moved from the port 910 to the port 920. The roughing pump can then be switched on to pump the chamber down to a pressure of about 1 Torr. The turbomolecular pump of the system may then be switched on until the system reaches full vacuum. The ionization source can then be ignited optionally after a desired amount of time after any gas lines are purged. The ignition source is then ignited. A pre-determined number of steps can be used to move the head of the sealing member 940 away from the port 920 to create a leak at the port 920. The current of the turbomolecular pump can be monitored to ensure the sealing member is not moved away too quickly or too far from the port 920. For example, the current being drawn by the turbomolecular pump can be monitored to ensure not too much fluid is entering into the manifold. If desired, the system can be configured with a current limit for the turbomolecular pump such that the system is switched off if the current draw exceeds a threshold limit. In other instances, movement of the sealing member 940 may be halted if the current exceeds the threshold value, and once the current stabilizes below a certain threshold, movement of the sealing member can be reinitiated. When the turbomolecular pump current draw stabilizes, the sealing member 940 can be moved incrementally away from the port 920.

The process of moving the sealing member 940 and monitoring the current draw can be repeated until the gas loads stabilize and a selected fluidic conductance is achieved. The final position of the sealing member 940 may be determined based on the number of steps from either where the sealing member 940 is placed against the port 920 or the net number of steps that the sealing member 940 should be moved based on the arbitrary zero position where the sealing member 940 is sealed against the port 910. Once the final position of the sealing member 940 has been reached, a gate valve can be opened to permit opening of the chamber to the mass spectrometer for analysis.

In certain embodiments, it may be desirable to permit users of the system to adjust the final position of the sealing member to account for altitude changes, port sizes, fluid flow rates or other parameters. In certain examples, a user may be able to select from two or more different final positions to provide some fine tuning of the fluidic conductance through the manifold. For example, it may be desirable to limit the fluidic conductance through the interface line to provide better sensitivities for low mass analytes such as, for example, lithium, beryllium, etc.

In some embodiments, the ports used in the manifold in a mass spectrometer may be about 5 mm in diameter to about 50 mm in diameter, for example, 16 mm diameter ports, 25 mm diameter ports or 40 mm diameter ports can be present on the manifold. In some embodiments, the backing line port may be about 16 mm in diameter, and the interface line port may be about 25 mm in diameter. Without wishing to be bound by any particular scientific theory, as the ratio between the interface port size and the backing line port size increases, the sealing member can be moved closer to the middle of the manifold without adversely affecting the fluidic conductance through the interface port.

In certain embodiments, the manifolds described herein can be provided in the form of a kit, optionally with a software program to control movement of the sealing member. If desired, suitable fluid couplings, fluid flow lines, electrical harnesses and other components may be included in the kits to permit retrofitting of existing instruments and devices with the manifolds described herein. For example, the valve assembly typically present in existing instruments can be replaced with one of the manifolds described herein. Suitable electrical couplings may be provided between the controller of the system and the manifold to permit control of the sealing member in the manifold. A firmware update can be performed to permit hardware or software control of the sealing member by the system.

Certain specific examples are described below to illustrate further some of the novel aspects and attributes of the technology described herein.

Example 1

Figure 10:
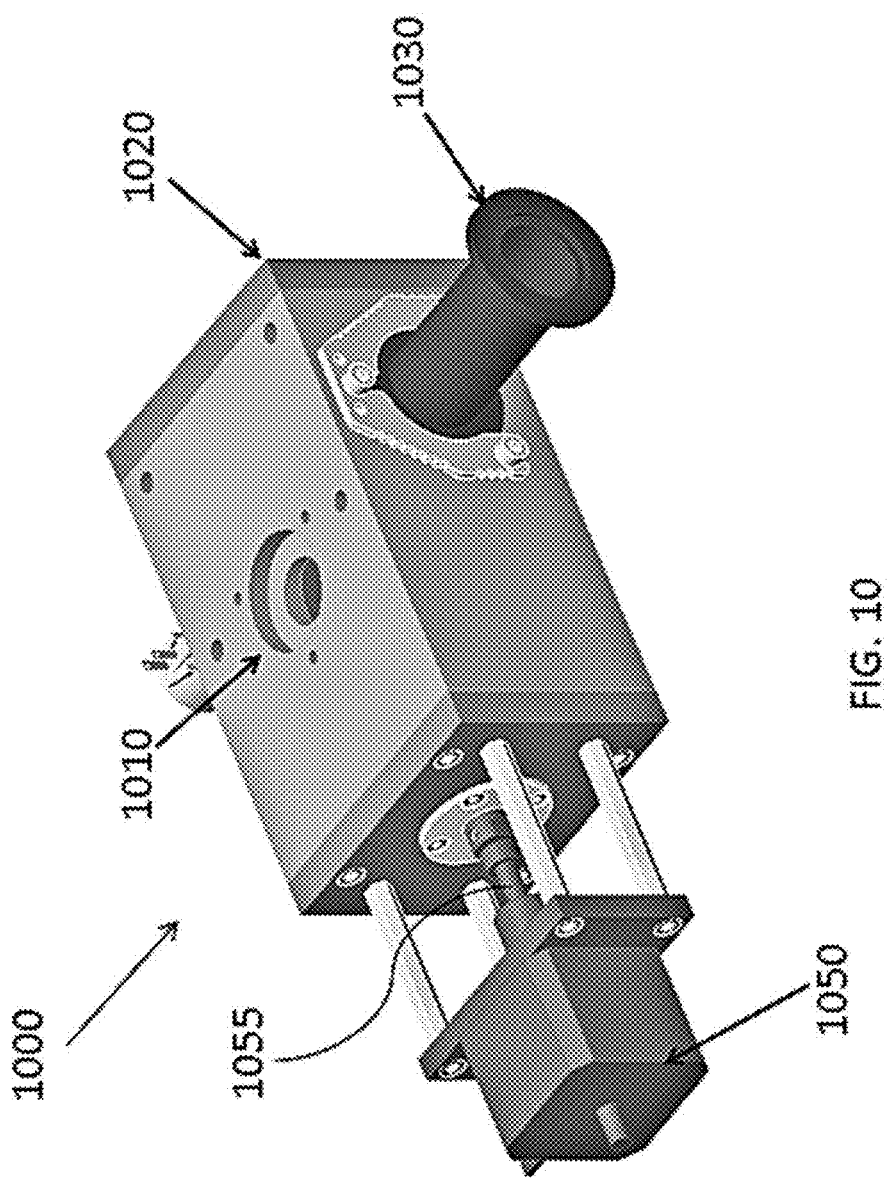
FIG. 10 is a perspective view of a manifold and a motor, in accordance with certain examples.

Referring to FIG. 10, an illustration of a manifold 1000 coupled to a motor 1050 is shown. The manifold 1000 comprises a port 1010 configured to couple to a fluid line of a turbomolecular pump, a port 1020 configured to couple to a fluid line from an interface and a port 1030 configured to couple to a fluid line from a roughing pump. The motor 1050 can be configured as a stepper motor which is coupled to an internal sealing member (hidden from view) through the shaft 1055.

Example 2

Figure 11:
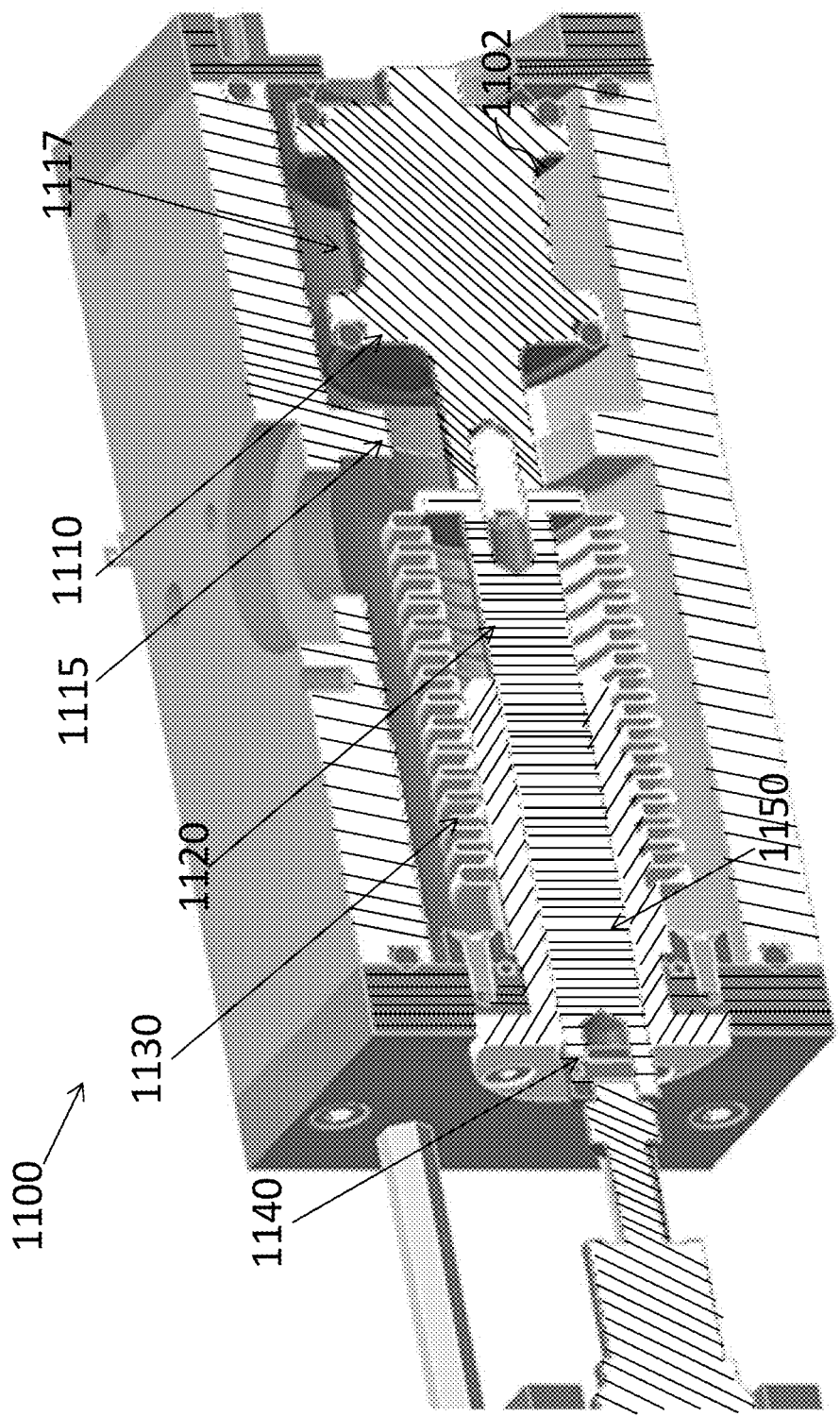
FIG. 11 is a cross-section of a manifold comprising an internal sealing member, in accordance with certain examples.

Referring to FIG. 11, an illustration of a manifold with a moveable, internal sealing member is shown. The manifold 1100 comprises a sealing member 1110 in the shape of a double headed plunger. The sealing member 1110 includes O-rings 1115 and 1117 on each end of the sealing member 1110. The sealing member also includes a longitudinal shaft 1120 coupled to the sealing member 1110. The longitudinal shaft 1120 has a bellows assembly 1130 surrounding it to seal the shaft 1120 from any fluids that may enter the manifold 1100. The shaft 1120 is coupled to a stepper motor (not shown) through a rod 1140. A guide bushing 1150 surrounds the shaft 1120 to maintain movement of the shaft in a direction substantially orthogonal to the side 1102 of the housing of the manifold 1100. In the configuration shown in FIG. 11, the sealing member 1110 can move a total distance of about 12 mm in the manifold When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A vacuum manifold system comprising:
   a housing comprising a first port configured to provide fluidic coupling between a sampling interface line and the manifold;
   a second port on the housing that is configured to provide fluidic coupling between a backing line of a turbomolecular pump and the manifold;
   a third port on a housing that is configured to provide fluidic coupling between a mechanical roughing pump and the manifold;
   a moveable sealing member in the housing, in which the moveable sealing member comprises a first position effective to permit fluid flow between the first port and the third port and effective to block fluid flow from the second port, in which the moveable sealing member comprises a second position effective to permit fluid flow between the second port and the third port and effective to block fluid flow from the first port, in which the moveable sealing member further comprises a third position effective to permit fluid flow between the first port, the second port and the third port; and
   a processor configured to monitor a current draw of the turbomolecular pump to control incremental movement of a head of the moveable sealing member away from the first port.

2. The vacuum manifold system of claim 1, in which the moveable sealing member comprises a sealing device configured to engage the second port in the first position of the moveable sealing member to provide a substantially fluid tight seal between the sealing member and the second port.

3. The vacuum manifold system of claim 2, in which the sealing device is configured to engage the first port in the second position of the moveable sealing member to provide a substantially fluid tight seal between the sealing member and the first port.

4. The vacuum manifold system of claim 3, in which the sealing device comprises a first O-ring that is between the sealing device and the second port when the sealing member is in the first position, and a second O-ring that is between the sealing device and the first port when the sealing member is in the second position.

5. The vacuum manifold system of claim 1, further comprising an actuator coupled to the moveable sealing member.

6. The vacuum manifold system of claim 5, in which the actuator comprises a motor.

7. The vacuum manifold system of claim 5, in which the sealing member comprises a plunger coupled to the actuator.

8. The vacuum manifold system of claim 7, in which the plunger comprises a longitudinal shaft coupled to the actuator and a disk coupled to the longitudinal shaft in an orthogonal direction to the longitudinal shaft, the disk configured to engage an interior housing surface adjacent to the first port in the second position of the moveable sealing member to provide a substantially fluid tight seal between the plunger and the first port to block fluid flow into the housing from the sampling interface line, in which the disk is further configured to engage an interior housing surface adjacent to the second port in the first position of the moveable sealing member to provide a substantially fluid tight seal between the plunger and the second port to block fluid flow into the housing from the pump backing line.

9. The vacuum manifold system of claim 7, in which the plunger comprises a first longitudinal shaft of a first outer diameter coupled to the actuator and a second longitudinal shaft of a second outer diameter, greater than the first outer diameter, coupled to the first longitudinal shaft, in which an end of the second longitudinal shaft is configured to engage an interior housing surface adjacent to the first port in the second position of the moveable sealing member to provide a substantially fluid tight seal between the plunger and the first port to block fluid flow into the housing from the sampling interface line, in which an opposite end of the second longitudinal shaft is configured to engage an interior housing surface adjacent to the second port in the first position of the moveable sealing member to provide a substantially fluid tight seal between the plunger and the second port to block fluid flow into the housing from the pump backing line.

10. The vacuum manifold system of claim 9, in which the second outer diameter is selected to be at least 5% greater than a diameter of the first port.

11. The vacuum manifold system of claim 7, in which the plunger comprises a longitudinal shaft coupled to the actuator and a barbell end coupled to the longitudinal shaft, in which a first surface of the barbell end is configured to engage an interior housing surface adjacent to the first port in the second position of the moveable sealing member to provide a substantially fluid tight seal between the engaged first surface and the first port to block fluid flow into the housing from the sampling interface line, in which a second surface of the barbell end is configured to engage an interior housing surface adjacent to the second port in the first position of the moveable sealing member to provide a substantially fluid tight seal between the engaged second surface and the second port to block fluid flow into the housing from the backing line.

12. The vacuum manifold system of claim 1, in which the third position of the sealing member is selected to position a terminal end of the sealing member closer to the first port of housing than to the second port of the housing.

13. The vacuum manifold system of claim 1, in which the third position of the sealing member is selected to provide a selected fluidic conductance.

14. The vacuum manifold of system claim 1, in which the sealing member comprises an actuator coupled to a longitudinal shaft, and a disk coupled to the longitudinal shaft in an orthogonal direction, in which the longitudinal shaft comprises a bellows effective to provide a substantially fluid tight seal between the housing and a site of the housing where the longitudinal shaft of the sealing member enters the housing.

15. The vacuum manifold system of claim 14, in which the actuator comprises a motor.

16. The vacuum manifold system of claim 15, in which the second position of the sealing member is provided after a fixed amount of steps using the motor.

17. The vacuum manifold system of claim 1, in which the sealing member comprises a substantially inert material.

18. The vacuum manifold system of claim 17, in which the substantially inert material is a plastic, a stainless steel, polytetrafluoroethylene, aluminum, titanium or an Inconel alloy.

19. The vacuum manifold system of claim 1, in which the sealing member is configured for use with an inductively coupled plasma mass spectrometer system, in which the sealing member is configured to be in the first position when a vacuum is off and the plasma is off, in which the sealing member is configured to be in the second position when the vacuum is on and when the plasma is off, and in which the sealing member is configured to be in the third position when the plasma is on.

20. The vacuum manifold system of claim 1, in which the housing is configured as a valveless housing.

* * * * *